United States Patent
Hearnden et al.

(10) Patent No.: US 12,475,309 B2
(45) Date of Patent: Nov. 18, 2025

(54) SYSTEMS AND METHODS FOR COLLABORATIVE EDITING OF ELECTRONIC OBJECTS

(71) Applicant: Canva Pty Ltd, Surry Hills (AU)

(72) Inventors: David Hearnden, Sydney (AU); Mindaugas Kazlauskas, Sydney (AU)

(73) Assignee: CANVA PTY LTD, Surry Hills (AU)

( * ) Notice: Subject to any disclaimer, the term of this patent is extended or adjusted under 35 U.S.C. 154(b) by 0 days.

(21) Appl. No.: 17/916,351

(22) PCT Filed: Apr. 1, 2021

(86) PCT No.: PCT/AU2021/050299
§ 371 (c)(1),
(2) Date: Sep. 30, 2022

(87) PCT Pub. No.: WO2021/195711
PCT Pub. Date: Oct. 7, 2021

(65) Prior Publication Data
US 2023/0124659 A1    Apr. 20, 2023

(30) Foreign Application Priority Data

Apr. 3, 2020  (AU) ................................ 2020901040

(51) Int. Cl.
*G06F 40/197*  (2020.01)
*G06F 9/54*    (2006.01)
(Continued)

(52) U.S. Cl.
CPC ............ *G06F 40/197* (2020.01); *G06F 9/546* (2013.01); *G06F 16/1767* (2019.01);
(Continued)

(58) Field of Classification Search
CPC .. G06F 40/197; G06F 16/1873; G06F 40/166; G06F 40/123; G06F 40/151; G06F 9/546
(Continued)

(56) References Cited

U.S. PATENT DOCUMENTS 10,757,171 B1 *  8/2020  Lucco ................ H04L 1/1621
2013/0232109 A1  9/2013  Deffler
(Continued)

FOREIGN PATENT DOCUMENTS

WO    2005050625 A2    6/2005
WO    2012065127 A1    5/2012

OTHER PUBLICATIONS

Operational Transformation, Wikipedia, https://web.archive.org/web/20200218182859/https://en.wikipedia.org/wiki/Operational_transformation (last visited Sep. 27, 2022), published on Feb. 18, 2020 as per Wayback Machine (Entire Document).
David Wang, Google Wave Operational Transformation, 1.1—Jul. 2010, https://svn.apache.org/repos/asf/incubator/wave/whitepapers/operational-transform/operational-transform.html (last visited Sep. 27, 2022) (Entire Document).
Written Opinion of the ISA for PCT/AU2021/050299 mailed Jun. 17, 2021 (Entire Document).
European Search Report for EP Application No. 21779622.6, mailed Feb. 27, 2024, pp. 1-13.

*Primary Examiner* — Stephen S Hong
*Assistant Examiner* — Tionna M Burke
(74) *Attorney, Agent, or Firm* — GrowIP Law Group LLC

(57) ABSTRACT

Described herein is a computer implemented method for editing an electronic object. The method includes maintaining a local version of the electronic object and a local buffer that includes one or more local deltas. A plurality of server deltas are received from a server system, each server delta being in respect of a remote edit made to the electronic object. The plurality of server deltas are composed to generate a single composed server delta which is then transformed against the one or more local deltas to generate a transformed server delta. The local version of the electronic document is then edited by applying the transformed server delta to the local version of the electronic document.

15 Claims, 9 Drawing Sheets

(51) Int. Cl.
  *G06F 16/176*  (2019.01)
  *G06F 16/18*  (2019.01)
  *G06F 40/123*  (2020.01)
  *G06F 40/151*  (2020.01)
  *G06F 40/166*  (2020.01)

(52) U.S. Cl.
  CPC ........ *G06F 16/1873* (2019.01); *G06F 40/123* (2020.01); *G06F 40/151* (2020.01); *G06F 40/166* (2020.01)

(58) Field of Classification Search
  USPC ........................................................ 715/229
  See application file for complete search history.

(56) References Cited

U.S. PATENT DOCUMENTS

| | | | |
|---|---|---|---|
| 2015/0373068 A1* | 12/2015 | Allen | H04L 65/1069 709/204 |
| 2017/0357675 A1 | 12/2017 | Underwood et al. | |
| 2019/0155791 A1 | 5/2019 | Kasetty et al. | |

* cited by examiner

SYSTEMS AND METHODS FOR COLLABORATIVE EDITING OF ELECTRONIC OBJECTS

CROSS-REFERENCE TO RELATED APPLICATIONS

This application is a U.S. National Stage Application that claims the benefit of the filing date of International PCT Application No. PCT/AU2021/050299, filed on Apr. 1, 2021, that claims priority to Australian Patent Application No. 2020901040, filed Apr. 3, 2020, that are hereby incorporated by reference in their entirety.

FIELD

The present disclosure is directed to systems and methods for collaborative editing of electronic objects.

BACKGROUND

Real-time collaborative editing platforms allow multiple users to work on the same electronic object at the same time from different computing systems. For example, Google Docs allows multiple users (via their different user systems) to simultaneously view and edit a document-type object.

Some real-time collaborative editing platforms are supported by operational transformation (OT) synchronisation protocols, which (generally speaking) are used to transform different edits made to an object by different users in order to maintain object consistency.

The processing involved in performing operational transformations can be significant, particularly if the number of concurrent users of an object, and/or the number of edits made by those users, is high.

Reference to background information in this specification is not an acknowledgment or suggestion that such information is either prior art or common general knowledge to a person of ordinary skill in the art.

SUMMARY

Described herein is a computer implemented method for editing an electronic object, the electronic object being edited in real time by multiple client applications, the method performed by a first client application and including: maintaining a local version of the electronic object; maintaining a local buffer, the local buffer including one or more local deltas, each local delta describing one or more edits made to the local version of the electronic document by a user of the first client application; receiving, from a server system, a plurality of server deltas, each server delta being in respect of a remote edit made to the electronic object; composing the plurality of server deltas to generate a single composed server delta; transforming the single composed server delta against the one or more local deltas in the local buffer to generate a transformed server delta; and editing the local version of the electronic document by applying the transformed server delta to the local version of the electronic document.

Figure 1:
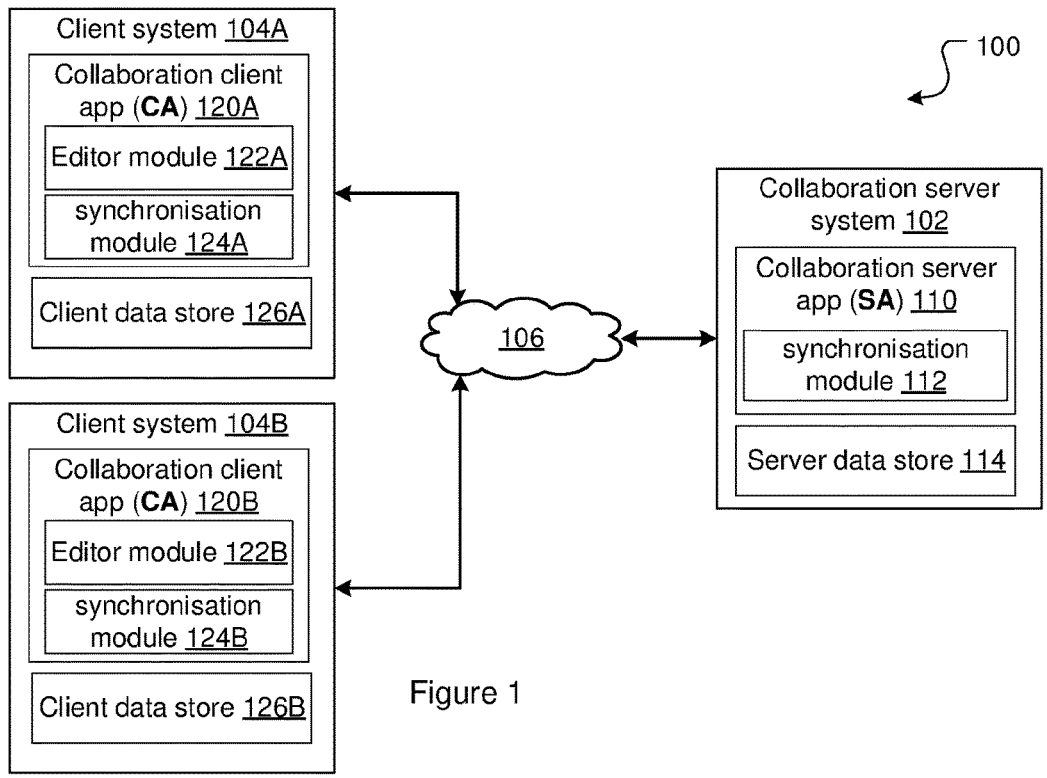
FIG. 1 illustrates an example networked environment in which real-time collaborative editing can be performed.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION OF THE EMBODIMENTS

In the following description numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

Overview

By way of general overview, the present disclosure provides techniques that allow multiple users (human or programmatic) to view and edit an electronic object at the same (or substantially the same) time.

The techniques described can be applied to various types of electronic objects, for example documents, presentations, web pages, images, designs, and other types of objects.

The systems and processing described herein provide a hosted conversation model for collaborative editing of an object. In such a model, a server (e.g. server application 110 described below) maintains a canonical copy of objects that can be collaboratively edited via client applications (e.g. client applications 120).

In order to edit (or simply view) a given object, a given user establishes a connection with a server via their client application and requests access to a particular object. Once the connection has been established, the user can (via their client application) view the object at their client device and performs local edits in a lock-free, non-blocking manner. These edits are subsequently synchronised with the server, which broadcasts the edits from each client back to all other connected clients.

From the edits submitted by clients, the server produces a linear operation history of the hosted object. This history is understood by all parties as a canonical "source of truth".

In addition, each client maintains a history of edits it has performed. The present disclosure describes synchronisation performed at each end of a client-server connection to resolve a client's local edit history against the server's canonical history containing the edits from all other clients.

Various collaborative editing platforms exist. One such platform is the Google Wave platform. The techniques described herein, however, differ from platforms such as the Google Wave platform in various ways.

For example, the protocol described herein allows clients to send multiple submits at once, rather than being forced to send submits one at a time. This results in a smoother experience for collaboration.

As another example, a client (and server) can arbitrarily buffer/queue messages in flight, and collapse them into a single message before transformation, resulting in more efficient synchronisation than existing techniques.

As a further example, the protocol described herein supports an architecture with proxies or intermediaries, allowing many clients to be multiplexed through a single proxy machine.

Other differences and advantages will become apparent from the disclosure.

Networked Environment

FIG. 100 depicts one example of a networked environment 100 in which the various operations and techniques described herein can be performed.

Environment 100 includes a collaboration server system 102 (server system 102 for short) which communicates with collaboration client systems 104 via one or more communications networks 106.

Collaboration server system 102 hosts a collaboration server application 110 (server application or SA 110 for short). The SA 110 is executed by the server system 102 to configure it to provide server-side functionality to one or more corresponding client applications (e.g. client applications 120A and 120B as discussed below). The SA 110 comprises one or more application programs, libraries, APIs or other software elements that implement the features and functions that are described herein. For example, where a CA 120 is a web browser, the SA 110 will be a web server such as Apache, IIS, nginx, GWS, or an alternative web server. Where a CA 120 is a dedicated collaboration platform application, the SA 110 will be an application server configured specifically to interact with that CA 120.

Server system 102 may host both a web server and an application server (or multiple web/application servers if demand requires).

In the present example, SA 110 includes (or has access to) a synchronisation module 112 (server SM 112 for short). As described below, the server SM 112 operates to synchronise edits received at the SA 110 from various client applications 120 and maintains a canonical history of all objects that the SA 110 is used to edit.

In the illustrated example, the server SM 112 is shown as being part of the SA 110. This may be due to those modules being a native part of SA 110 or installed as extensions/plug-ins/add-ons to the SA 110. In alternative embodiments, the server SM 112 may be a separate program that runs on the server system 102 (either on the same computer processing system that runs the SA 110 or a different computer processing system) and communicate with the SA 110.

Server system 102 also includes a server data store 114 for storing data relevant to its operations. Server data store 114 may be any system or combination of systems suitable for storing and accessing data. For example, server data store 114 may be a database accessed by an appropriate database front end.

Each collaboration client system 104 hosts a collaboration client application 120 (CA 120 for short) which, when executed by the collaboration client system 104, configures it to provide client-side functionality/interact with sever system 102 (or, more specifically, a SA 110 running thereon).

The CA 120 may be a general web browser application (such as Chrome, Safari, Internet Explorer, Opera, or an alternative web browser application) which accesses the SA 110 via an appropriate uniform object locator (URL) and communicates with the SA 110 via general world-wide-web protocols (e.g. http, https, ftp). Alternatively, the CA 120 may be a dedicated collaboration application programmed to communicate with SA 110 using defined application programming interface (API) calls.

In the present example, CA 120 includes an EM 122 (EM 122 for short) and a client synchronisation module 124 (client SM 124 for short). Generally speaking, the EM 122 provides a user of the client system 104 with an editing interface that can be used to make changes to objects (e.g. by normal editing operations). The EM 122 also causes changes made to the object based on messages received from the SA 110 to be displayed (i.e. edits that have been made to the object at other CAs 120). The client SM 124 operates to synchronise edits that are made by the user of the client system 104 and that are received at the SA 110.

EM 122 and client SM 124 are described as part of the CA 120. EM 122 and client SM 124 may be native to the CA 120 or installed as extensions/plug-ins/add-ons to the CA 120. In alternative embodiments, the EM 122 and/or client SM 124 may be separate programs that run on the client system 104 and communicate with the CA 120.

A given collaboration client system 104 may have more than one CA 120, for example both a general web browser application and a dedicated programmatic client application.

Collaboration client system 104 further includes a client data store 126 for storing data relevant to its operations. Typically client data store 126 will be a local memory of the client system 104 (e.g. volatile memory 208 and/or non-transient memory 210 as discussed below), however a client system's data store may be a remote data store accessible, for example, over network 106.

The collaboration server system 102 and collaboration client systems 104 communicate data between each other either directly or indirectly through one or more communications networks 106. Communications network 106 may comprise a local area network (LAN), a public network, or a combination of networks.

Environment 100 depicts as a single logical collaboration server 110. This may be a single collaboration server application running on a single computer processing system. Alternatively, the server system 102 may be a clustered server architecture in which multiple server instances (or nodes) are provided on one or more computer processing systems to meet system demand.

Environment 100 shows two client systems 104A and 104B, however, a typical environment 100 will likely include many more client systems 104 in communication with the collaboration server system 102.

Collaboration server system 102 may be any computer processing system which is configured (or configurable) by hardware and/or software to provide server-side functionality. Similarly, client system 104 may be any computer processing system which is configured (or configurable) by hardware and/or software to provide client-side functionality. By way of example, suitable client and/or server systems may include server computer systems, desktop computers, laptop computers, netbook computers, tablet computing devices, mobile/smart phones, personal digital assistants, personal media players, set-top boxes, games consoles.

One example of a computer processing system is described below with reference to FIG. 2.

Computer Processing System

Various embodiments and features of the present disclosure are implemented using one or more computer processing systems. For example, in FIG. 1, each client system 104 is a computer processing system, and server system 102 comprises one or more computer processing systems.

Figure 2:
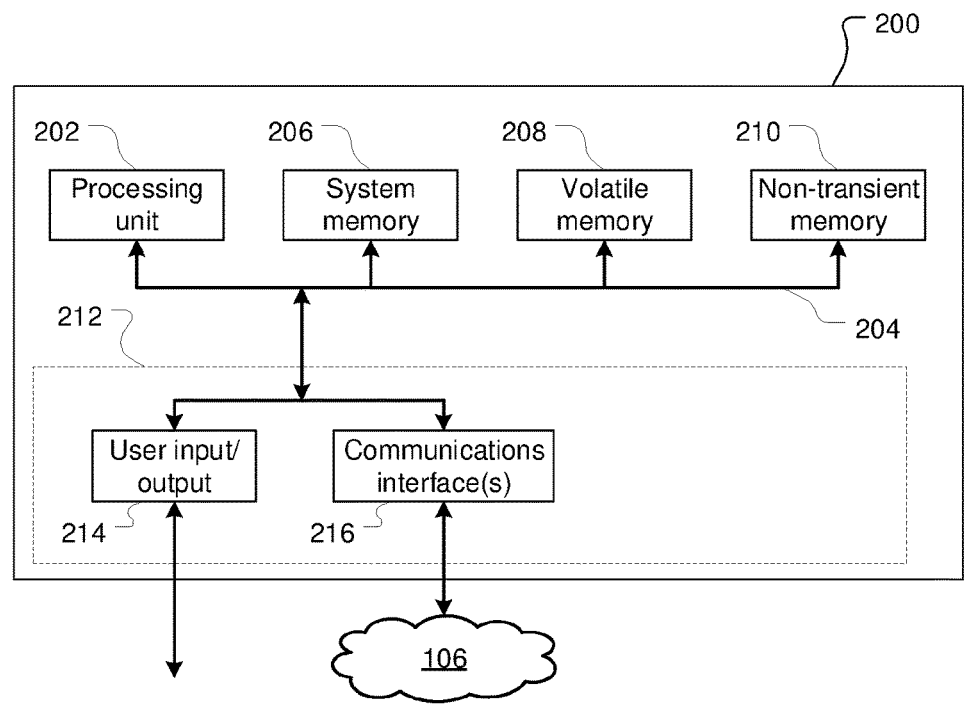
FIG. 2 is a block diagram of a computer processing system configurable to perform various features of the present disclosure.

FIG. 2 provides a block diagram of a computer processing system 200 configurable to implement embodiments and/or features described herein. System 200 is a general purpose computer processing system. It will be appreciated that FIG. 2 does not illustrate all functional or physical components of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 200 includes at least one processing unit 202. The processing unit 202 may be a single computer processing device (e.g. a central processing unit, graphics processing unit, or other computational device), or may include a plurality of computer processing devices. In some instances all processing will be performed by processing unit 202, however in other instances processing may also be performed by remote processing devices accessible and useable (either in a shared or dedicated manner) by the system 200.

Through a communications bus 204 the processing unit 202 is in data communication with a one or more machine readable storage (memory) devices which store instructions and/or data for controlling operation of the processing system 200. In this example system 200 includes a system memory 206 (e.g. a BIOS), volatile memory 208 (e.g. random access memory such as one or more DRAM modules), and non-volatile memory 210 (e.g. one or more hard disk or solid state drives).

System 200 also includes one or more interfaces, indicated generally by 212, via which system 200 interfaces with various devices and/or networks. Generally speaking, other devices may be integral with system 200, or may be separate. Where a device is separate from system 200, connection between the device and system 200 may be via wired or wireless hardware and communication protocols, and may be a direct or an indirect (e.g. networked) connection.

Wired connection with other devices/networks may be by any appropriate standard or proprietary hardware and connectivity protocols. For example, system 200 may be configured for wired connection with other devices/communications networks by one or more of: USB; FireWire; eSATA; Thunderbolt; Ethernet; OS/2; Parallel; Serial; HDMI; DVI; VGA; SCSI; AudioPort. Other wired connections are possible.

Wireless connection with other devices/networks may similarly be by any appropriate standard or proprietary hardware and communications protocols. For example, system 200 may be configured for wireless connection with other devices/communications networks using one or more of: infrared; BlueTooth; WiFi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are possible.

Generally speaking, and depending on the particular system in question, devices to which system 200 connects—whether by wired or wireless means—include one or more input devices to allow data to be input into/received by system 200 for processing by the processing unit 202, and one or more output device to allow data to be output by system 200. Example devices are described below, however it will be appreciated that not all computer processing systems will include all mentioned devices, and that additional and alternative devices to those mentioned may well be used.

For example, system 200 may include or connect to one or more input devices by which information/data is input into (received by) system 200. Such input devices may include keyboards, mice, trackpads, microphones, accelerometers, proximity sensors, GPS devices and the like. System 200 may also include or connect to one or more output devices controlled by system 200 to output information. Such output devices may include devices such as a CRT displays, LCD displays, LED displays, plasma displays, touch screen displays, speakers, vibration modules, LEDs/other lights, and such like. System 200 may also include or connect to devices which may act as both input and output devices, for example memory devices (hard drives, solid state drives, disk drives, compact flash cards, SD cards and the like) which system 200 can read data from and/or write data to, and touch screen displays which can both display (output) data and receive touch signals (input).

System 200 may also connect to one or more communications networks (e.g. the Internet, a local area network, a wide area network, a personal hotspot etc.) to communicate data to and receive data from networked devices, which may themselves be other computer processing systems.

System 200 may be any suitable computer processing system such as, by way of non-limiting example, a server computer system, a desktop computer, a laptop computer, a netbook computer, a tablet computing device, a mobile/smart phone, a personal digital assistant, or an alternative computer processing system.

Typically, system 200 will include at least user input and output devices 214 and a communications interface 216 for communication with a network such as network 106 of environment 100.

System 200 stores or has access to computer applications (also referred to as software or programs)—i.e. computer readable instructions and data which, when executed by the processing unit 202, configure system 200 to receive, process, and output data. Instructions and data can be stored on non-transient machine readable medium accessible to system 200. For example, instructions and data may be stored on non-transient memory 210. Instructions and data may be transmitted to/received by system 200 via a data signal in a transmission channel enabled (for example) by a wired or wireless network connection over interface such as 212.

Applications accessible to system 200 will typically include an operating system application such as Microsoft Windows®, Apple OSX, Apple IOS, Android, Unix, or Linux.

System 200 also stores or has access to applications which, when executed by the processing unit 202, configure system 200 to perform various computer-implemented processing operations described herein.

For example, and referring to the networked environment of FIG. 1 above, each client system 104 includes a client application 120 which configures the client system 104 to perform the described client system operations, and server system 102 includes a server application 110 which configures the server system 102 to perform the described server system operations, In some cases part or all of a given computer-implemented method will be performed by system 200 itself, while in other cases processing may be performed by other devices in data communication with system 200.

Object Versions

In the present disclosure, the SA 110 and each CA 120 maintain a version identifier for a given object that is being (or has been) edited.

The client and server version identifiers (abbreviated as cv and sv respectively) are independent, in the sense that a given client's version identifier for a particular object are not related to another client's version identifiers for that object or the server's version identifiers for that object. A given client's version identifier allows that client to track its own, local state, of an object and allows the server to track that particular client's state of the object. The server version identifier is used to track the server's version of the object (the canonical version).

The protocol described herein requires a given set of version identifiers (i.e. the version identifiers maintained by a particular CA 120 or the version identifiers maintained by the SA 110) to be ordered, however does not require there to be any notion of "distance" between two version identifiers.

By way of example, one possible implementation of such version identifiers are ordinal numbers—e.g. a monotonically increasing sequence of integers such as (0, 1, 2, . . . ). In certain implementations, client version identifiers take this form.

As another example, timestamps may be used as version identifiers, in conjunction with a sequence number (the sequence number used in the event that two timestamps happen to be the same)—e.g. (1585091071632-0, 1585091874453-0, 1585091874453-1, 1585091875337-0, . . . ). In certain implementations, the SA 110 maintains server version identifiers in this form. In particular, SA 110 can be configured to use a data store such as a Redis data store for an object's canonical history. In this case, the Redis stream data type can be used which automatically assigns such version numbers when items are added to the stream.

Alternative client and/or server version identifiers can be used.

For readability, the examples provided herein will use increasing integers for client version identifiers—e.g. (0, 1, 2, . . . , n) and increasing integer pairs for server version identifiers—e.g. (0-0, 1-1, 2-1, . . . , n-n) (recognising that in certain implementations the first integer of a given server version identifier will actually be a timestamp).

Communication Protocol

In the present disclosure, CA 120 and CS 110 are configured to connect in a way that provides a reliable, ordered, duplex message stream between them. Any appropriate connection protocol providing such features may be used, for example a TCP connection, a websocket connection, or an alternative connection.

In this disclosure, messages sent from a given CA 120 to the SA 110 will be referred to as client messages, while messages sent from the SA 110 to a given CA 120 will be referred to as a server messages.

Connection

In order to commence editing of a given shared object, a CA 120 opens a connection to that shared object with a connection request.

In the present implementation this involves the CA 120 generating a connect message that includes an identifier of the given object, a server version identifier of the object that the client application wishes to connect to, and a client version identifier of the object. For example:

Connect(ObjectId, sv, cv)

Prior to opening a streaming connection, the client must have a (sv, state) snapshot that corresponds to an entry in the server's canonical history. The client can obtain such a snapshot in various ways, such as making a dedicated request to the server via some other channel (e.g., an http request), or the client may be able to use a snapshot it has from a previous editing session on the same object. The (sv, state) does not have to be the current or most recent state on the server; any historical state is sufficient.

The CA 120 is configured to initialised the client version identifier to an initial value (e.g. 0) when the client first connects to a given object. As discussed below, during a collaborative editing session in respect of the object the CA 120 updates the client version identifier. If the CA 120 disconnects from the object then reconnects it can use its current value of the client version identifier for the object.

Messaging

Once a CA 120 has established a connection with an object maintained by the SA 110 (e.g. per the connection message above), a user of the CA 120 can view/edit the object. In addition, the CA 120 can receive messages from the SA 110 in respect of edits to the object by other CAs 120.

To this end, the present disclosure provides four types of messages, each of which will be described in turn.

When a CA 120A receives a local edit (i.e. an edit to the object made by a user of the CA 120A), the CA 120A generates a ClientSubmit message and communicates it to the SA 110. In the present embodiments, the ClientSubmit message includes: a client version identifier (cv) that indicates the client application's version identifier of the object following the edit; and a delta (d) describing the edit that has been locally made. E.g.:

ClientSubmit(cv, d)

When the SA 110 makes an edit to an object (based on an edit received from a CA 120 that is connected to that object), the SA 110 generates a ServerSubmit message and communicates it to CAs 120 that are connected to the object. In the present embodiments, the ServerSubmit message includes: a server version identifier (sv) that indicates the server application's version identifier of the object following the edit; and a delta (d) describing the edit that has been made. E.g.:

ServerSubmit(sv, d)

Once a CA 120A has received one or more ServerSubmit messages it acknowledges receipt thereof by generating a ClientAck message and communicating it to the SA 110. In the present embodiments, the ClientAck message includes a server version identifier (sv) that indicates that the CA 120A has received all ServerSubmit messages up to the server version included in the ClientAck message. E.g.:

ClientAck(sv)

Once a SA 110 has received one or more ClientSubmit messages from a given CA 120A, it acknowledges receipt thereof by generating a ServerAck message and communicating it to that CA 120A. In the present embodiments, the ServerAck message includes a server version identifier (sv) and a client version identifier (cv). The client version identifier in the ServerAck message indicates that the SA 110 has received all ClientSubmit messages up to that client version. The server version identifier in the ServerAck message indicates the server version for the object in question after processing all ClientSubmit messages up to the client version. E.g.:

ServerAck(sv, cv)

As will be appreciated, the above message structure allows a CA 120 to acknowledge several ServerSubmit messages with a single ClientAck message and the SA 110 to acknowledge several ClientSubmit messages from a given CA with a single ServerAck message.

Example Communications

Figure 3:
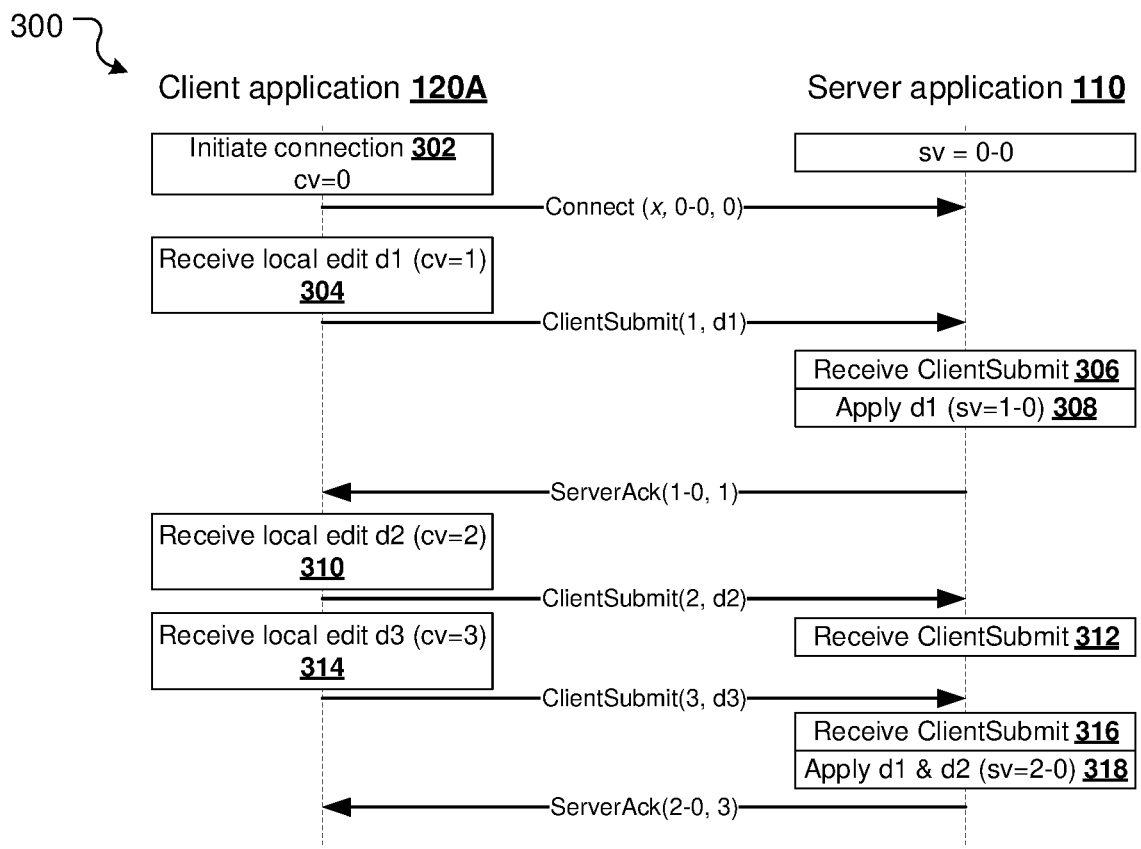
FIG. 3 is an example message passing diagram.
Figure 4:
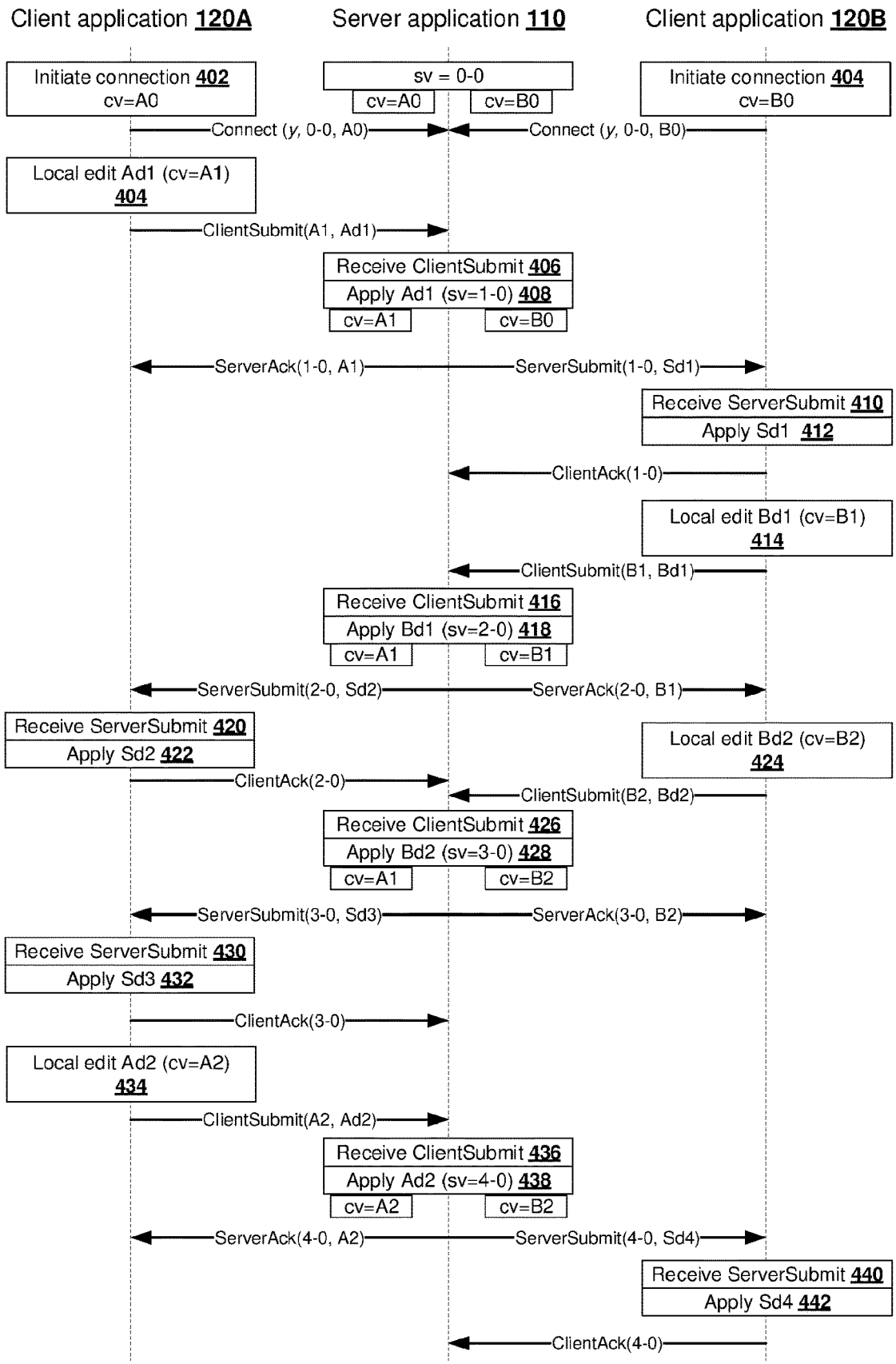
FIG. 4 is an example message passing diagram.

Turning to FIGS. 3 and 4, and in order to provide a general overview of the communication protocol, two example message passing diagrams are provided to illustrate operation of the protocol described above. Following this, further detail as to the operation of the server SM 112 and client SM 124 in generating and processing messages is provided.

Message passing example 300 of FIG. 3 involves a single client application 120A connecting to and editing an object maintained by the SA 110. The initial server version identifier (sv) of the object in question is 0-0.

At 302, the CA 120A initiates a connection with the SA 110 with a connect message: Connect(x, 0-0, 0). This indicates the CA 120A wishes to connect to the object with identifier x; server version 0-0 of the object; and the client version of the object is 0.

At 304, the CA 120A receives a local edit made to object x by a user. A delta (d1) expressing the edit is generated and the CA 120A increments the client version to 1 (i.e. after applying delta d1 the client version is 1). The CA 120A then generates and communicates a client submit message: ClientSubmit (1, d1). This indicates that after applying edit d1 the client version is 1.

At 306, the SA 110 receives the ClientSubmit message re d1.

At 308, the SA 110 applies delta d1 to the server version of the object. As discussed below, this will normally involve SA 110 generating a server delta corresponding to the delta received in the ClientSubmit message. As there is a single client connected in this example, however, transformation is not necessary.

Application of the delta by SA 110 results in the server version being updated—in this example to sv=1-0. (As noted, in an example implementation the server version is a timestamp and sequence identifier, the timestamp being the time the delta is saved to the canonical object history by the server.)

The SA 110 then generates and communicates a ServerAck to CA 120A: ServerAck(1-0,1). This indicates to CA 120A that the server has received all ClientSubmits from CA 120A up to client version 1, and that applying the deltas in those ClientSubmits takes the server version of the object to version 1-0.

As there is only one client connected in example 300, there is no need for SA 110 to generate/communicate a ServerSubmit message in respect of the delta applied.

At 310, the CA 120A: receives another local edit; generates a delta (d2) expressing the edit; increments the client version (to 2); generates and communicates a client submit message: ClientSubmit (2, d2). This indicates that after applying edit d2 the client version is 2.

At 312, the SA 110 receives the ClientSubmit message re d2.

At 314, the CA 120A: receives a further local edit; generates a delta (d3) expressing the edit; increments the client version (to 3); generates and communicates a client submit message: ClientSubmit (3, d3). This indicates that after applying edit d3 the client version is 3.

As can be seen, CA 120A generates and communicates the ClientSubmit message re d3 prior to receiving any acknowledgement of the ClientSubmit message re d2.

At 316, the SA 110 receives the ClientSubmit message re d3.

At 318, the SA 110 applies d2 and d3 to the server version of the object and then updates the server version to, in this example, 2-0. In this case, the SA 110 has composed deltas d2 and d3 together (as described below) and applied the resulting composition. The SA 110 then generates and communicates a ServerAck to CA 120A: ServerAck (2-0,3). This indicates to CA 120A that the server has received all ClientSubmits from CA 120A up to client version 3, and that applying the deltas in those ClientSubmits takes the server version of the object to version 2-0.

Message passing example 400 of FIG. 4 involves a two client applications 120A and 120B connecting to and editing an object maintained by the SA 110. The initial server version identifier (sv) of the object in question is 0-0.

In this example, for readability, client version client version identifiers and are prefixed with 'A' and 'B' (indicating CA 120A and CA 120B respectively). In practice, such prefixes can be used if desired but are not required as SA 110 maintains separate state data for each connected client.

At 402 and 403 CA 120A and CA 120B initiate connections with the SA 110. In both cases the connect message is: Connect(y, 0-0,[A/B]0), indicating the connection is with object id y; server version 0-0 of the object; and for both CAs their local version identifiers for the object start at [A/B]0.

At 404, CA 120A: receives a local edit; generates a delta (Ad1) expressing the edit; increments the client version (to A1); generates and communicates a client submit message: ClientSubmit (A1, Ad1). This indicates that after applying edit Ad1 the local version at CA 120A is A1.

At 406, SA 110 receives the ClientSubmit message re Ad1.

At 408, SA 110 applies delta Ad1 to the server version of the object. This will typically involve generating a server delta (in this case Sd1) corresponding to the delta received in the ClientSubmit message. As delta Ad1 is the first delta transformation, however, transformation is not required (or, alternatively, the transformation process will end up in a server delta that is the same as delta AD1). Applying the delta results in an updated server version—in this example sv=1-0 and, as discussed below, the delta being added to the object's history.

SA 110 then generates and communicates a ServerAck to CA 120A: ServerAck(1-0, A1). This indicates to CA 120A that the server has received all ClientSubmits from CA 120A up to client version A1, and that applying the deltas in those ClientSubmits takes the server version of the object to version 1-0.

SA 110 also generates and communicates a ServerSubmit message to all other connected clients—in this case CA 120B: ServerSubmit(1-0, Sd1). This indicates to CA 120B that after applying delta Sd1 the server local version of the object is 1-0.

At 410, CA 120B receives the ServerSubmit message re Sd1

At 412, CA 120B applies delta Sd1 to its local version of the object. As discussed below, this may involve transforming the delta received in the ServerSubmit message (in this case Sd1). CA 120B then generates and communicates a ClientAck message: ClientAck(1-0). When received by SA 110 this indicates that CA 120B has received all ServerSubmit messages up to server version 1-0.

At 414, CA 120B: receives a local edit; generates a delta (Bd1) expressing the edit; increments the client version (to B1); generates and communicates a client submit message: ClientSubmit (B1, Bd1). This indicates that after applying edit Bd1 the local version at CA 120B is B1.

At 416, SA 110 receives the ClientSubmit message re delta Bd1.

At 418, SA 110 applies delta Bd1 to the server version of the object. As discussed below, this involves generating a server delta (in this case Sd2) corresponding to the delta received in the ClientSubmit message. Once the delta has been applied, SA 110 updates the server version—in this example to sv=2-0.

SA 110 then generates and communicates a ServerAck to CA 120B: ServerAck(2-0, B1). This indicates to CA 120B that the server has received all ClientSubmits from CA 120B up to client version B1, and that applying the deltas in those ClientSubmits takes the server version of the object to version 2-0.

SA 110 also generates and communicates a ServerSubmit message to CA 120A: ServerSubmit(2-0, Sd2). This indicates to CA 120A that after applying edit Sd2 the server local version of the object is 2-0.

At 420, CA 120A receives the ServerSubmit message re Sd2.

At 422, CA 120A applies delta Sd2 to its local version of the object. As discussed below, this may involve transforming the delta received in the ServerSubmit message (in this case Sd2). CA 120A then generates and communicates a ClientAck message: ClientAck(2-0). When received by SA 110 this indicates that CA 120A has received all ServerSubmit messages up to server version 2-0.

FIG. 4 depicts additional local edits being made at CA 120B (at 424) and at CA 120A (at 434) the associated messages/processing. This are similar to the messages/processing described above.

Object Synchronisation

When a CA 120 receives a delta (e.g. in a ServerSubmit message) it must apply that delta to the client's local version of the object in question. Similarly, when the SA 110 receives a delta (e.g. in a ClientSubmit message) it must apply that delta to the server version of the object in question.

As discussed further below, a CA 120 or the SA 110 can, in some circumstances, combine multiple deltas into a single delta (via one or more compose operations) before applying that single delta.

In order to apply a given delta a transformation operation will, in most cases, be necessary. This is to account for the fact that a delta received in a submit message may have been made by the sender of the submit message to a different version of the object than the current version of the object at the receiver of the submit message.

Transformation operations are discussed further below. This section describes the manner in which the SA 110 and CA 120 manage deltas and version numbers. In the present implementation, delta management (and synchronisation) is handled by the synchronisation module (SM).

Initially, operation of the client application client SM 124 will be described. Following this, operation of the server application server SM 112 will be described.

Client Application Synchronisation

Figure 5:
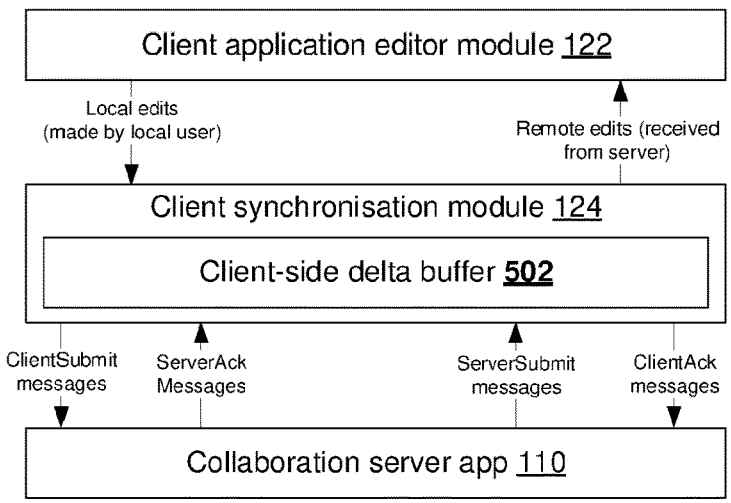
FIG. 5 depicts operation of a client synchronisation module.

FIG. 5 provides a representation of the interaction between a client synchronisation module (SM) 124, the client editor module (EM) 122, and the collaboration sever 110.

During collaborative editing of a particular object, the client SM 124 maintains a client-side delta buffer 502 for that particular object.

Local editing in the present disclosure is non-blocking. Accordingly, when a user of the CA 120 makes an edit to an object that is being collaboratively edited the edit is immediately applied to the local version of the object by the EM 122 (i.e. before any ClientSubmit message is communicated and/or any ServerAck message is received).

When a local edit is made, the EM 122 also communicates data in respect of the edit to the client SM 124.

The client SM 124 then generates a local delta in respect of the edit. In alternative implementations, the EM 122 may generate the delta and pass this to the client SM 124.

The client SM 124 then places the delta in the client-side delta buffer 502. In the present embodiments, the client SM 124 flags deltas in the client-side delta buffer as either unacknowledged (i.e. a delta that the CA 120 has communicated to the SA 110 in a ClientSubmit message) or pending (i.e. a delta that the CA 120 has not yet communicated to the SA 110).

Initially, therefore, a given delta corresponding to a local edit is placed in the client-side buffer as a pending delta.

Periodically, the client SM 124 generates ClientSubmit messages for pending deltas in the buffer. Once a ClientSubmit message in respect of a pending delta has been communicated to the SA 110, the client SM 124 flags that delta as an unacknowledged delta.

In the present embodiment, the client SM 124 assigns a client version identifier to a delta at the time of generating a ClientSubmit message. I.e. when a delta is included in a ClientSubmit message the client SM 124 updates the current version identifier (e.g. by incrementing a current client version variable maintained by the client SM 124) and associates that version identifier with the delta.

In alternative embodiments, the client SM 124 can be configured to update and assign a client version identifier to a delta at the time it is added to the client-side buffer 502 (i.e. as a pending delta). This can, however, result in unnecessary version identifiers being generated/assigned—e.g. in the case that pending deltas in the client-side delta buffer 502 are combined (composed) as described below.

The client SM 124 can be configured to process pending deltas in the client-side buffer 502 (by generating ClientSubmit messages) in various ways. For example, the client SM 124 may be configured to implement a sliding window type scheme for generating ClientSubmit messages: i.e. so that a maximum number of unacknowledged deltas are permitted in the buffer at any given time.

As an example, if the sliding window (max number) was set to eight, then the client SM 124 could communicate at most eight ClientSubmit messages to the CS 110 without receiving a ServerAck message. Once a ServerAck message is received, the client SM 124 can send one or more further ClientSubmit messages.

Conversely, if the sliding window (max number) was set to one, then the client SM 124 could communicate a single ClientSubmit message to the CS 110 before having to await a ServerAck message. Using a window of this size (one) would, in some respects, lead to the collaboration platform being similar to existing collaboration platforms which require every delta submitted to be acknowledged before a further delta can be sent.

Additional logic can be implemented to determine the size of a given client SM 124's window (by SM 124 itself and/or by the SA 110). For example, a given client SM 124 might choose to throttle the rate at which it sends ClientSubmit messages, such as sending them no faster than one message per 250 ms. A given client SM 124 can also monitor the latency between its ClientSubmit messages and receiving corresponding ServerAck acknowledgements, and adjust its rate of sending to window-size/latency, in order to aim for the fastest submit rate that will remain steady.

Generally speaking, however, a small window size for a given client A means that other clients will observe client A's editing operations in slower and larger chunks. A window size of 1 means that a client's edits will end up chunked into units no smaller than that client's round-trip time to the server. A large window size means a client A can submit more fine-grained edits at a faster rate, such that other clients will observe A's editing as being smoother. The potential disadvantages, however, are that sending submits at a faster rate requires more server processing to keep up with the higher message throughput.

When the client SM 124 receives a ServerAck message from the CS 110, it clears all unacknowledged deltas from the client-side buffer 502 up to (and including) the delta associated with the client version identifier indicated in the ServerAck message.

Client SM 124 can also receive (at any time) a ServerSubmit message that includes a server delta (i.e. a delta in respect of an edit to the object that has been made by another client).

When a ServerSubmit message is received, the client SM 124 processes it.

In some instances, the SM 124 may immediately process a ServerSubmit message that has been received. Initially, this involves determining whether transformation of the delta received in the ServerSubmit message is required. Transformation will be required if there are any deltas (pending or unacknowledged) in the client-side buffer 502. If not, no transformation is necessary.

If there are one or more deltas in the client-side buffer 502, the client SM 124 transforms the delta included in the ServerSubmit message against all deltas (pending and unacknowledged) in the client-side buffer. (Delta transformations are discussed further below).

The client SM 124 then applies the delta (transformed if necessary) to the current version (e.g. a current state) of the object at the client. This involves communicating with the EM 122 to cause it to display the edit(s) to the object caused by application of the delta.

Once the delta has been applied, the SM 124 generates a ClientAck message including the server version identifier included in the ServerSubmit message.

In other instances, the SM 124 may delay processing a ServerSubmit message once it has been received. In this case, if additional ServerSubmit messages are received before the SM 124 processes the original ServerSubmit message the SM 124 composes the deltas included in those ServerSubmit messages together to generate a composed server delta.

SM 124 then determines whether transformation of the composed server delta is required. As above, transformation will be required if there are any deltas (pending or unacknowledged) in the client-side buffer 502. If not, no transformation is necessary.

If there are one or more deltas in the client-side buffer 502, the client SM 124 transforms the composed server delta against all deltas (pending and unacknowledged) in the client-side buffer. The client SM 124 then applies the composed delta (transformed if necessary) to the current version (e.g. a current state) of the object at the client.

Where ServerSubmit messages are combined in this way the SM 124 may generate a ClientAck message including the server version identifier included in the latest ServerSubmit message once the composed delta has been generated and/or applied.

Various examples are provided below to illustrate the processing described above.

In these examples, each delta generated in respect of a local edit is added to the client-side buffer as a buffer object. Pending buffer objects have the following format:

{Δ}

Unacknowledged buffer objects have the following format:

[Δ, x]

In both cases, Δ is the delta. For unacknowledged buffer objects, x is the client-side version identifiers (in the present examples an incrementing integer).

Furthermore, the client-side buffer is maintained as an ordered data structure—e.g. a list, stack, queue or other ordered data structure. Accordingly, a buffer object's position in the buffer is important and denotes order.

While the above format has been adopted for readability, in the present embodiments the relevant aspects of a given buffer object in the buffer are that: its order relative to other deltas in the buffer can be determined; it can be identified as either a pending or unacknowledged delta; and for an unacknowledged delta, the object allows the client-side version associated with that delta to be determined.

Client Application Synchronisation: Example 1

In this example, the collaborative editing of the object in question starts with a client version of 0 (cv=0) and server version of 0-0 (sv=0-0).

The first local edit (made to local version 0 of an object) results in a delta buffer as follows:

{Δa}

I.e. a buffer with a single pending delta.

The client SM 124 then: increments the client version identifier (from 0 to 1); generates a ClientSubmit message (1, Δa) and communicates it to the SA 110; and amends the buffer object in the buffer to flag it as an unacknowledged delta, resulting in a delta buffer as follows:

[Δa, 1]

The client SM 124 then receives a ServerAck message, e.g. (1-0, 1) indicating that the SA 110 has received client messages up to cv=1. On receipt of this message, client SM 124 can remove buffer object [Δa, 1] from the buffer (in this case resulting in an empty buffer).

Client Application Synchronisation: Example 2

In this example, the collaborative editing of the object in question starts with a client version of 0 (cv=0) and server version of 0-0 (sv=0-0).

Once again, the first local edit (made to local version 0 of an object) results in a delta buffer as follows:

{Δa}

The client SM 124 then performs processing to generate/communicate a ClientSubmit message (1, Δa) to the SA 110 (as described hi example 1 above). This results in a delta buffer as follows:

[Δa, 1]

A second local edit is then made, resulting in a delta buffer as follows:

[Δa, 1] {Δb}

A third local edit is then made, resulting in a delta buffer as follows:

[Δa, 1] {Δb} {Δc}

In this example, the client SM 124 performs processing to generate/communicate separate ClientSubmit messages in respect of the first two pending buffer objects in the buffer to the SA 110: I.e. ClientSubmit (2, Δb) and ClientSubmit (3, Δc). The resulting delta buffer is:

[Δa, 1] [Δb, 2] [Δc, 3]

Client SM 124 may then receive a ServerAck message, e.g. (1-0, 2) indicating that the SA 110 has received client messages up to cv=2. On receipt of this message, client SM 124 can remove buffer objects [Δa, 1] and [Δb, 2] from the buffer, resulting in a client-side buffer of:

[Δc, 3]

(If, instead, the ServerAck message was (1-0, 3), the client SM 124 could remove all buffer objects from the buffer, resulting in an empty client-side buffer.)

Client Application Synchronisation: Example 3

In example 2, a single ServerAck message served to acknowledge multiple ClientSubmit messages.

As a more general case of this, consider a buffer with the state:

[Δa, 1] [Δb, 2] . . . [Δ, i] [Δ, j] {Δx} {Δy} . . .

In this case, a ServerAck message of (x-x, i) serves to acknowledge all unacknowledged client buffer objects in the client-side buffer up to and including the buffer object with cv=i—i.e. resulting in a buffer of:

[Δ, j] {Δx} {Δy} . . .

Client Application Synchronisation: Example 4

In example 2, the following delta buffer was generated:

[Δa, 1] {Δb} {Δc}

In this case, instead of generating/communicating separate ClientSubmit messages in respect of the first two pending buffer objects, client SM 124 could combine the two pending buffer objects into a single buffer object by performing a compose operation on the deltas thereof ((compose (Δb, Δc)) as described below). The client SM 124 then generates a new pending buffer object with the composed delta (in this case represented as Δbc) and replaces the buffer objects that have now been combined with the new buffer object, resulting in a delta buffer of:

[Δa, 1] {Δbc}

Client SA 124 could then generate/communicate a ClientSubmit message on the new buffer object—i.e.: ClientSubmit (2, Δbc), resulting in a client-side buffer of:

[Δa, 1] [Δbc, 2]

Client SM 124 may then receive a ServerAck message, e.g. (1-0, 2) indicating that the SA 110 has received client messages up to cv=2. On receipt of this message, client SM 124 can remove buffer objects [Δa, 1] & [Δbc, 2] resulting in an empty client-side buffer.

More generally, client SM 124 can be configured to compose together any number of adjacent pending buffer objects (or adjacent local deltas) into a single delta and include that single delta in a single ClientSubmit message. Various approaches may be adopted for this.

For example, the client SM 124 may compose local deltas together as they are added to the buffer. E.g. a local delta that is generated when the client-side buffer has no pending deltas is added to the buffer as a pending delta. A local delta that is generated when the client-slide buffer does have a pending delta is composed with that pending delta and the composed delta is then added to the client-side buffer as a pending delta (replacing the existing pending delta). When this approach is adopted the client-side buffer will maintain a single pending delta at any given time.

Alternatively, the client SM 124 may store new local deltas in a temporary list (or other data structure) then periodically purge the temporary list by composing all deltas therein to a single delta and then generating a single ClientSubmit message including that single delta. In some circumstances, this approach—holding then batch-composing local deltas at the point of generating a ClientSubmit message—provides for more efficient processing than serially performing compose operations as new local deltas arrive.

Client Application Synchronisation: Example 5

In this example, the collaborative editing of the object in question starts with a client version of 0 (cv=0) and server version of 0-0 (sv=0-0).

In this example, two local edits are generated and a ClientSubmit message is sent in respect of the first of those edits. This results in a buffer as follows

[ΔC1, 1] {ΔC2}

Client SM 124 then receives a ServerSubmit message: ServerSubmit(1-0, ΔS1).

To process the ServerSubmit message, the client SM 124 determines there are deltas in the client-side buffer. Accordingly, the client SM 124 transforms the delta in the ServerSubmit message (ΔS1 in this case) against all deltas in the client-side buffer (ΔC1 & ΔC2 in this case).

Figure 6:
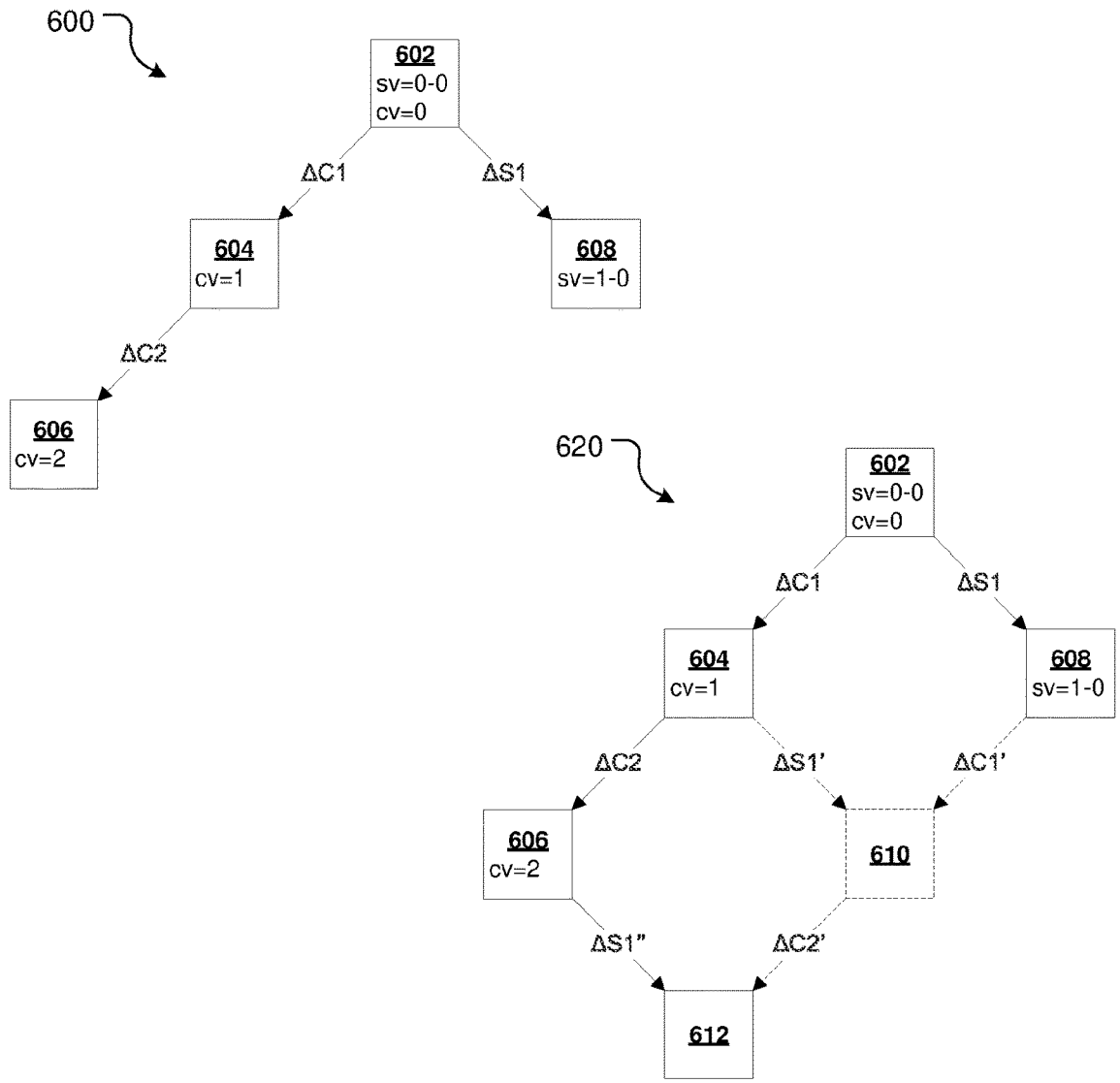
FIG. 6 provides example state space diagrams.

FIG. 6 provides an example state space diagram 600 representing the three edits in question.

In the state space diagrams used in the present disclosure (e.g. FIGS. 6, 7, 9, and 10): a solid line box represents an actual object state (i.e. an object state that has been generated by applying a delta); a solid line arrow joining two object states represents a delta that has been applied to an object state (the state at the start of the arrow) to generate another object state (the state at the end of the arrow); a broken line box represents a potential object state (i.e. an object state that could be generated by applying a delta); a broken line arrow joining two object states represents a delta that could be applied to an object state (the state at the start of the arrow) to generate another object state (the state at the end of the arrow).

State 602 of state space 600 represents the starting state of the object (sv=0-0, cv=0). At this point the client and server versions of the object are synchronised (i.e. sv 0-0=cv 0).

From state 602, CA 120 locally applies delta ΔC1, transitioning the client state of the object to state 604 (cv=1). From state 604, CA 120 locally applies delta ΔC2, transitioning the client state of the object to state 606 (cv=2).

At the same time, SA 110 applies a delta ΔS1 (received from another client), transitioning the sever state of the object to state 608 (sv=1-0).

As shown illustrated in state space diagram 620, to apply delta ΔS1 the client application client SM 124 first needs to transform it against the local deltas.

To do so, client SM 124 can, for example: perform a transformation operation on (ΔC1, ΔS1) to generate (ΔC1', ΔS1'); then perform a transformation operation on (ΔC2, ΔS1') to generate (ΔC2', ΔS1").

The client SM 124 can then apply delta ΔS1 " to the local version of the object (i.e. state 606).

The client SM 124 then generates/communicates a ClientAck message indicating it is current to the server version (e.g. ClientAck(1-0)).

At this point, and if no other edits were made, once the server SA 110 has received/transformed/applied the client's local edits ΔC1 & ΔC2 the client and server versions of the object will be synchronised.

Client Application Synchronisation: Example 6

In example 5 above, a ServerSubmit message (ServerSubmit(1-0, ΔS1)) is received by the client's client SM 124 while the buffer is in the following state.

[ΔC1, 1] {ΔC2}

In example 5, the ServerSubmit message is processed by performing two transformation operations to (ultimately) generate ΔS1", which is then applied to the client version of the object.

As discussed further below, however, the present disclosure provides compose and transform functions that satisfy a transform/compose commutation property. In order to illustrate this, instead of performing the two transformation operations as described in example 5 above, the transform/compose commutation property would allow client SM 124 to: compose the two local client deltas (e.g. compose (ΔC1, ΔC2)) to generate a single delta ΔC(1,2)); transform that single delta against the server delta (e.g. transform (ΔC(1,2), ΔS1)=(ΔC(1,2)', ΔS1")); then apply the transformed server delta (ΔS1") to the current local state of the object.

Figure 7:
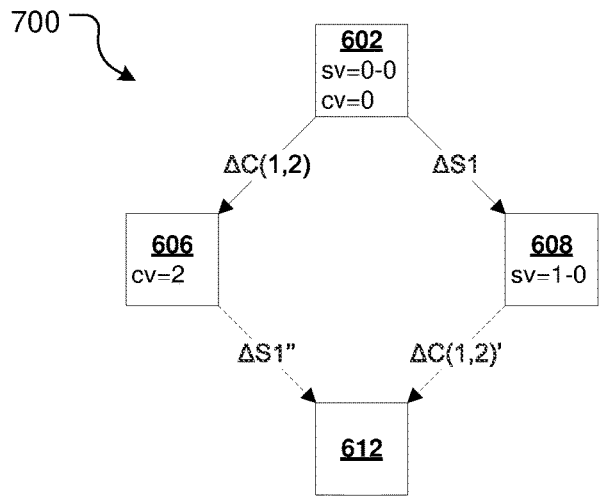
FIG. 7 is an example state space diagram.

State space diagram 700 of FIG. 7 provides an example of this.

Once client SM 124 has transformed the server delta and applied it, client SM 124 generates/communicates a ClientAck message indicating it is current to the server version (e.g. ClientAck(1-0)).

At this point, and if no other edits were made, once the server SA 110 has received/transformed/applied the client's local edits ΔC1 & ΔC2 the client and server versions of the object will be synchronised.

While this particular example serves to illustrate the transform/compose commutation property it is unlikely that client SM 124 would be configured to compose multiple client deltas from the client-side delta buffer in the course of processing a server delta received in a server submit message. Even if this was done the client SM 124 would need to retain the individual deltas in the client-side delta buffer, at least for acknowledgement and client reconnection purposes (discussed further below).

More practically, the transform/compose commutation property allows a client delta (unacknowledged or pending) to be transformed against any length sequence of server deltas (received in ServerSubmit messages) by composing the sequence of server deltas, transforming the delta resulting from the composition against the client delta to generate a transformed delta, then applying the transformed server delta to the current local (client) state of the object.

For example, consider a client SM 124 buffer with the state:

[ΔC1, 1]

And receipt of a sequence of three ServerSubmit messages:

ServerSubmit(1-0, ΔS1)
ServerSubmit(2-0, ΔS2)
ServerSubmit(3-0, ΔS3)

In this case the client SM 124 can apply the server deltas in the ServerSubmit messages by:

Composing all server deltas—e.g.:
Compose(ΔS1, (Compose(ΔS2, ΔS3)))=Composed server delta ΔS(1, 2, 3)
Transforming the client delta against the composed server delta—e.g.:
Transform (ΔC1, ΔS(1, 2, 3))=(ΔC1', ΔS(1, 2, 3)')
Applying the transformed composed server delta (ΔS(1, 2, 3)') to the client's current object state.

In this example, server deltas for a given CA 120 are accumulated, composed together, and then transformed against client deltas in a similar manner to that described above.

Figure 11:
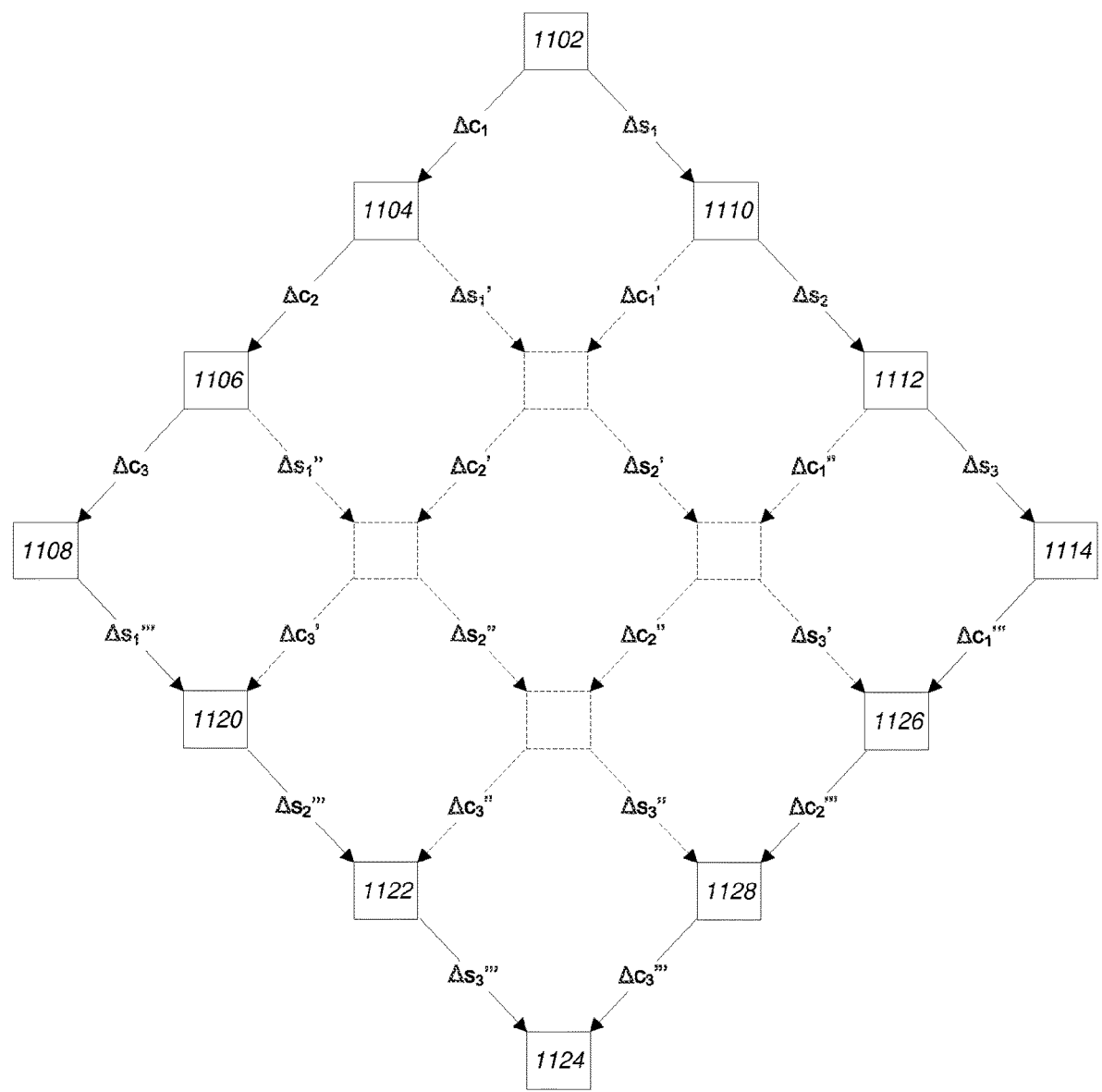
FIG. 11 is an example state space diagram.

More generally, when a client has N unacknowledged ClientSubmit messages, and it receives M ServerSubmit messages it is faced with the scenario depicted in FIG. 11. In this case, instead of doing N×M transformations, the transform/compose commutation property allows the client instead to compose the M deltas from the ServerSubmit messages into one delta, and then do only N transformations (similar to scenario 620 of FIG. 6). Doing so result in the client performing N+M units of work instead of N×M units of work.

This situation is symmetric in server-side processing. For example, the server can compose deltas from the N ClientSubmit messages it has received into a single delta, and then do M transformations, one for each delta of the M unacknowledged ServerSubmit messages.

Server Application Synchronisation

Server application synchronisation is, in many respects, similar to client application synchronisation described above. There are, however, also differences.

For server application synchronisation, message handling is, in a sense, reversed to client application synchronisation. For example the server SM 112 processes ClientSubmit messages in a similar fashion to how the client SM 124 processes ServerSubmit messages.

Another difference, of course, is that SA 110 can receive ClientSubmit/ClientAck messages from many clients (in contrast to the CA 120 which receives ServerSubmit/ServerAck messages from a single server).

Figure 8:
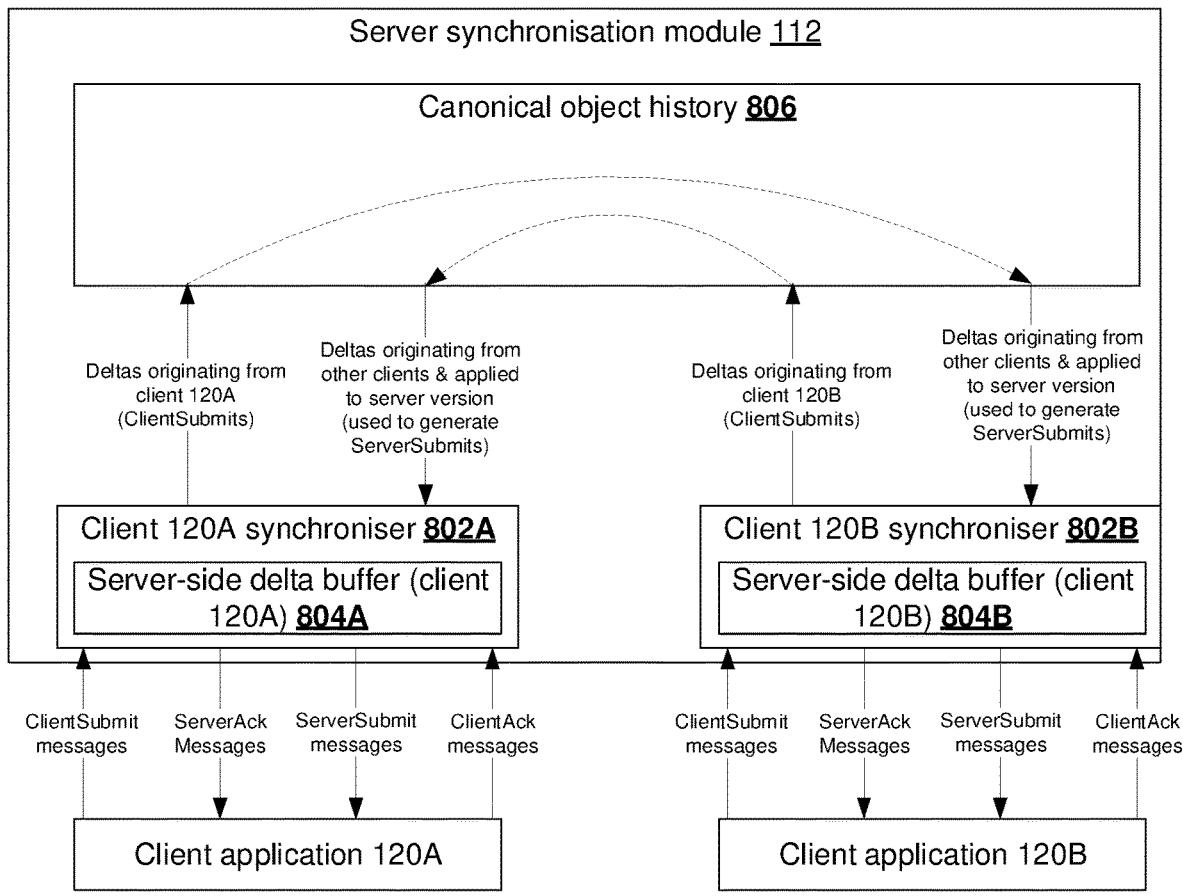
FIG. 8 depicts operation of a server synchronisation module.

In order to account for this, and as illustrated in FIG. 8, the server SM 112 provides a synchroniser 802 for each client connected to the object in question, each synchroniser 802 maintaining a server-side delta buffer for its client. In the illustrated example, two clients 120A and 120B are connected to the object in question. Therefore, server SM 112 provides: a synchroniser 802A and server-side client buffer 804A for client 120A; and a synchroniser 802B and server-side client buffer 804B for client 120B.

When an incoming message is received by the SA 110 (e.g. a ClientSubmit or ClientAck message), the server initially identifies the originating CA 120: i.e. the connected CA 120 the message originated from. This originating client can be determined, for example, by reference to communication protocol data associated with the CA120/SA110 connection and/or other metadata associated with the client originating messages. The originating client is used to determine which synchroniser 802 is to process the incoming message.

In the event of a ClientAck message, the relevant synchroniser 802 processes the message in a similar manner to how the client SM 124 processes a ServerAck message (described above). For example by deleting objects in the client's server-side buffer up to/including the object relating to the server version included in the ClientAck message.

In the event of a ClientSubmit message, the relevant synchroniser 802 processes the message in a similar manner to how the client SM 124 processes a ServerSubmit message (as described above). For example, the synchroniser 802 determines whether the delta in the ClientSubmit message needs to be transformed (which will be the case if there are any pending or unacknowledged deltas in the relevant server-side client buffer 804) and, if so, makes the transformation. In addition, the synchroniser causes the delta to be saved in the canonical object history 806 (in an object history item as described further below).

Canonical Object Histories

As noted, the SA 110 maintains a canonical object history for each object the SA 110 manages. Various mechanisms for maintaining a canonical object history for a given object are possible.

Generally speaking, object histories can be implemented to have various properties, including being append only and being observable by all connected clients.

Object histories also support locking: if concurrent operations are received, only one can succeed. In certain implementations, optimistic locking can be implemented. In this case if a submit does fail the client(s) in question can resynchronise with the server version using the object history. In alternative implementations, a pessimistic locking mechanism can be provided.

In one implementation, a Redis stream can be used to maintain the canonical history for a given object.

In the present embodiments, the canonical object history is maintained by the server SM 112 (e.g. history 806). In alternative implementations object histories may be maintained by a separate module/application in communication with the server SM 112.

As described below, synchronisers 802 are configured to add object history items corresponding to client deltas (i.e. deltas received in ClientSubmit messages) that are processed to the object history. In the present embodiments, each object history item includes a delta (i.e. the delta the item relates to) and a server version identifier (indicating the server version after the delta is applied). An object history item may also include a client identifier (indicating the particular CA (or user account) the delta originated from), and a client version identifier (taken from the ClientSubmit message causing generation of the object history item). E.g.:

[sv, Δ, client_id, cv]

In certain implementations, inclusion of a client identifier and client version identifier in an object history item are optional. This allows, for example, the server system 102 to inject edits (i.e. deltas) that did not originate from any connected CA 120—and, accordingly, which result in object history items without a client-id or client-version identifier.

Each synchroniser 802 is also configured to access the object history and, over time, sequentially process all items that are added to it.

When a synchroniser processes an item of the object history, it first determines whether the client_id of the item indicates that the item relates to a delta that originated from the synchroniser's own client or a different client. E.g. if the object history item in question has client ID 120A and the synchroniser 802 is associated with client 120A, the item is associated with the synchroniser's own client.

If the item is associated with the synchroniser's own client, the synchroniser 802 generates a ServerAck message based on the item and communicates the ServerAck message to its client. The object history item is then processed and the synchroniser can process the next object history item.

If the item is associated with another client (determined via an alternative client_id) or no client (determined, in this case, by absence of a client_id), the delta in the item did not originate from the synchroniser's client. In this case, the synchroniser 802 generates a ServerSubmit message based on the item. The ServerSubmit message includes the delta and server version identifier from the item. The object history item is then processed and the synchroniser can process the next object history item.

Once all synchronisers 802 have processed all items in the object history 806 (and all clients have processed the ServerSubmit messages generated by doing so), the object is synchronised: i.e. the state of the object at the SA 110 and the local states of the object at all connected CAs 120 is the same.

Where a CA 120 disconnects from the SA 110 the CA 120 can reconnect.

To do so, the CA 120 generates and communicates a connect message with a client version identifier value that is before the client version value of any unacknowledged client submit in its buffer.

The CA 120 then re-sends ClientSubmit messages in respect of each unacknowledged delta in its buffer. On resending a ClientSubmit message for a given unacknowledged delta, the CA 120 uses the same client version identifier as was used in the ClientSubmit message that was originally generated/communicated to the server for that delta. The delta, however, can be different if it was transformed in the meantime.

To facilitate reconnection in this way, ClientSubmit message are handled idempotently by client synchronisers 802 in the server syhcnronisation module 112. This makes it safe for a client to re-send any ClientSubmit messages without the SSM 112 applying any delta twice.

To provide this, the SSM 112 maintains a client-state table in the same persistence as the canonical object history (e.g. the Redis data store) that tracks the latest client version of each client. If the object is identified by x, then client state may be recorded as follows:

ClientState(x, client_id, client version identifier)

Each transaction that a client synchroniser performs to add a delta to the object history also ensures that its client version matches the latest client version for the client in ClientState table, and also (transactionally) updates it to the client version of the entry being added to the object history. This transaction can be performed optimistically or pessimistically (though where a Redis data store is used the transaction is optimistic as such transactions are supported by Redis).

When a client synchroniser 802 is handling a ClientSubmit(cv, d) by performing that transaction to add an entry to the object history it inspects the client-state entry for its client id. If the client synchroniser 802 determines the cv of the ClientSubmit message is not greater than the last recorded client version in the ClientState table, it can simply ignore that ClientSubmit message (in this case the ClientSubmit message is interpreted as a message that has been resubmitted).

In some implementations the client synchroniser 802 is configured to perform additional steps to verify that such a ClientSubmit message has already been received. This involves finding the previously received ClientSubmit message (i.e. the one with the same client version identifier as the one being processed) in the canonical object history and checking that the deltas are the "same" (after any necessary transformations).

The data stored in an object's history 806 allows any CA 120 to resynchronise its local version of an object with the server version—e.g. in the event a CA 120 is disconnected from the SA 110, messages go awry, or other issues arise.

Examples of server-side processing for each message type are described below.

Server Application Synchronisation: ClientSubmit Messages

On receiving a ClientSubmit message, the server SM 112 initially determines which CA 120 the message is from and, therefore, which synchroniser 802 is to process it. In the present example the ClientSubmit messages is from CA 120A and, therefore, the message (or relevant data therefrom) is passed synchroniser 802A.

The synchroniser 802A then determines whether the delta in the ClientSubmit message needs to be transformed. If there are no deltas in client 120A's server-side buffer 804A, the delta does not need to be transformed. Otherwise, the delta does need to be transformed and the synchroniser 802A does this (e.g. as described in Client application synchronisation: Example 5 or Client application synchronisation: Example 6 above).

The Synchroniser 802A then creates an object history item for the delta and saves that item to the object history 806. The object history item includes an identifier for client 120A, a client version identifier, the transformed delta, and the server version identifier (which in the present case is generated by the tool (Redis) used to maintain the object history when the object item is added to it). E.g.:

[12345-1, ΔAx, 120A, A1]

In a similar fashion to operation of client SM 124 as described above, a client synchroniser 802A may delay processing a ClientSubmit message once it has been received rather than immediately trying to transform and add the delta in the ClientSubmit message to the object history 806. In this case, if additional ClientSubmit messages are received before the synchroniser 802A processes the original ClientSubmit message the synchroniser 802A composes the deltas included in those ClientSubmit messages together to generate a composed client delta. Synchroniser 802A then transforms the composed client delta against any deltas (pending or unacknowledged) in the server-side client buffer 804A and any relevant deltas in the object history 806 before adding the resulting (single) delta to the object history 806 in an object history item. In this case the client version of the object history item is set as the latest client version identifier of the ClientSubmit messages whose delta's have been composed together.

Before adding the delta from the ClientSubmit message (transformed if necessary) to the object history, the synchroniser 802A ensures that the server-side delta buffer 804A has caught up with the latest history (as per the object history items stored in the object history 806, some of which may not have yet been processed by the synchroniser 802A).

In order to do this, two transformation passes are performed. In the first transformation pass the delta of the ClientSubmit is transformed past the deltas that are in the synchroniser's server-side delta buffer 804A at the time (which may be lagging behind the committed object history in persistence). This pass happens outside any transaction with the object history 806, and therefore can be performed in parallel by any synchronisers that may be trying to submit a delta to the object history. Once the delta from the ClientSubmit message is up-to-date with respect to the server-side delta buffer 804A (i.e. has been transformed against the deltas therein) the second transformation pass is performed. In the second transformation pass an object history transaction is started. At this point any additional entries in the object history 806 are discovered, and the delta of the ClientSubmit is further transformed against deltas of such additional entries if necessary. The ability to process deltas from client submit messages in this manner—i.e. a first transformation pass in which a ClientSubmit delta is transformed against deltas in the server-side delta buffer 804A and a second transformation pass in which the delta is (if necessary) further transformed against deltas in any relevant object history items—is provided by the transform/compose commutation property discussed above.

Client synchroniser 802A could be configured to instead perform a single pass. In many cases, however, this is less efficient because it would hold a transaction open for longer. If implementing a single pass approach, the single pass would involve opening the transaction, querying for any additional history items that have not yet shown up in the server-side buffer 802A, and then transforming the ClientSubmit against the composition of all the server-side buffer deltas and all additional history items. In this case any additional history items that are read as part of the transaction are discarded when the transaction is committed. They are not added to the server-side buffer 804A at that time. Instead, they are left to show up in the server-side buffer 804A in due course, via the subscription that is populating that buffer normally.

Processing the ClientSubmit message is then complete.

Server Application Synchronisation: ServerAck Messages

In due course, as synchroniser 804A processes the items in the object history 806, it will encounter this item (i.e. [12345-1, Δx, 120A, A1]).

When processing the item, the synchroniser 802A initially analyses the client identifier in the item to determine whether the item originated from its own client or not. In this case, client identifier 120A is the client that synchroniser 804A is associated with.

On determining this, the synchroniser 804A generates a ServerAck message that includes the server version identifier from the item and the relevant client version identifier (as obtained from the object history item).

The synchroniser 804A then sends the ServerAck message to its client application—CA 120A.

Processing of the item from the object history 806 is complete.

Server Application Synchronisation: ServerSubmit Messages

Synchroniser 802B is also processing items from the object history 806 and, in due course, encounters the example item above:

[12345-1, Δx, 120A]

When processing this item, the synchroniser 802B initially analyses the client identifier in the item to determine whether the item originated from its own client or not. In this case, client identifier 120A is not the client that synchroniser 804B is associated with.

Accordingly, synchroniser 802B creates a buffer object and adds the buffer object to the server-side delta buffer 802B. The buffer object is based on the item and created in a similar way to the manner in which the client SM 124 creates a buffer object on a local client edit being made. The buffer object for the server synchroniser 802B, however, includes the server version identifier. For example, processing the above item generates a buffer object (initially pending) as follows:

{Δx, 120A}

A synchroniser 806 then processes items in the server-side buffer in a similar way to the processing of the client-side buffer by the client SM 124. For example, a synchroniser 802 can compose multiple pending buffer objects in a given client's server-side delta buffer 804 together into a single (combined) buffer object. (See Client application synchronisation: Example 4 above.)

In due course, the synchroniser 802B will generate a ServerSubmit message based on the above buffer object and communicate it to client 120B. On doing so, the synchroniser 802B updates the buffer object to reflect it is now an unacknowledged buffer object:

[Δx, 120A]

Furthermore, and as with the client SM 124, a synchroniser 802 can be configured to define the maximum number of unacknowledged buffer objects in the buffer. A synchroniser 802 can be configured to dynamically set a maximum number for its particular client. By doing so, the synchroniser 802 effectively throttles ServerSubmit messages to its client. For example, if synchroniser 802A determines that its client 120A is taking too long to acknowledge ServerSubmit messages, it may reduce the size of the window (i.e. the maximum number of permitted unacknowledged ServerSubmit messages)—or even disconnect its client. At the same time, if synchroniser 802B determines that its client 120B is responding to ServerSubmit messages quickly, it may increase the size of the window.

Server Application Synchronisation: ClientAck Messages

During operation, the server SA 112 will receive ClientAck messages (each including a server version identifier).

When a ClientAck message is received, the server SA 112 initially determines the originating CA 120 for the message and, accordingly, the relevant synchroniser 802.

The synchroniser 802 in question then clears the client's server-side delta buffer 804 up to (and including) the buffer object relating to the server version indicated in the ClientAck message.

The communication protocol described above (and operational transformation processing also described herein) allows for sequences of messages to be collapsed. In other words, a given CA 120 (or SA 110) can send multiple Submit messages without having to wait for any acknowledgement. Following this, a CA 120 can acknowledge several ServerSubmit messages with a single ClientAck message and the SA 110 can acknowledge several ClientSubmit messages from a given CA with a single ServerAck message.

By providing a platform in which a client or server application can send multiple submits at once, rather than being forced to send one at a time, a user experience which is 'smoother' or less 'jittery' can be provided. To illustrate this, consider the following two examples of edits that are displayed by a CA 120 (each line of the example indicating a state-change/new edit):

| | |
|---|---|
| => "T" | => "T" |
| | => "The" |
| | => "The qu" |
| | => "The quick" |
| => "The quick b" | |
| | => "The quick br" |
| | => "The quick brow" |
| => "The quick brown" | => "The quick brown" |
| Version 1 ('Jittery') | Version 2 |

As can be seen, in version 1 a user would see a small edit initially, then a delay, then a big clumped edit, then a delay, then another big clumped edit. The delay between the "T" and "The quick b" is indicative of that client's round-trip time to the server.

In version 2, a user would see a sequence of small edits. If the window size (described earlier) is large enough, the spacing of those edits seen by other clients does not need to be constrained by the authoring client's round-trip time to the server.

Furthermore, allowing multiple submits to be made at once allows for submit messages to be arbitrarily buffered/queued in flight (by either the SA 110 or a CA 120, or even a proxy). Successive buffered/queued messages can then be collapsed into a single message before transformation, resulting in more efficient synchronisation than protocols which require each individual submit to be acknowledged. This also allows for an architecture in which multiple client applications 120 can be multiplexed through a single proxy machine. That single proxy machine can be configured to impose its own flow control on the messages is receives. For example, such a proxy may be configured to enforce a maximum throughput or minimum latency, by delaying, buffering, and composing adjacent submit or acknowledgement messages.

Electronic Objects, Deltas, and Delta Operations

In certain embodiments, the state of an entity and its evolution over time is described by what will be referred to as a domain. In some respects, the domains of the present disclosure are similar to Category Theory categories.

A domain of the present disclosure describes a space of possible states for an entity, and to this end can be considered similar to a data type (e.g. a Boolean or a list of numbers). Unlike a data type, however, a domain also describes how an entity of the domain evolves from one state to another. An evolutionary step from one state to another is referred to as a delta. A domain, therefore, describes both the static aspects of an editable entity (i.e. the states) and the dynamic aspects of an editable entity (i.e. the deltas).

In the following description, domains are presented using the Haskell typeclass syntax.

Formally, a domain is parameterized by a datatype representing states, S, and a datatype representing deltas, D. In the present implementation, each domain defines five functions over its state datatype and its delta datatype: identity, apply, unapply, compose, and transform. In the Haskell typeclass syntax, with 's' being the state datatype and 'd' being the delta datatype, these functions can be represented as follows:

```
class Domain s d where
    identity              :: s → d
    apply                 :: s → d → s
    unapply               :: s → d → s
    compose               :: d → d → d
    transform             :: (d, d) → (d, d)
```

In addition to these functions (and in a strict Haskell approach), the functional dependencies |s->d, d->s are also required.

The identity function takes a state as input and generates a delta (which will be referred to as the identity delta). The nature of the identity delta is such that applying the identity delta to the input state (using the apply function described below) returns that same state.

The apply function takes a state and a delta as inputs and generates a state—i.e. the state that results from applying the input delta to the input state.

The unapply function is the inverse of the apply function. Accordingly, the unapply function also takes a state and a delta as inputs and output a state—in this case the state that results from unapplying (or undoing) the input delta to the input state.

The compose function takes two sequential deltas as inputs and generates a single delta—i.e. the composition of the two input deltas.

The transform function takes a pair of diverging deltas as inputs and generates a pair of converging deltas—i.e. an Operational Transformation.

The domain functions described above are characterised by the following relationships:

| | Domain function relationships |
|---|---|
| apply | s identity(s) = s |
| unapply | s identity(s) = s |
| unapply | (apply s d) d = s |
| apply s | (compose d e) = apply (apply s d) e |
| compose | d (identity s) = d |
| compose | (identity s) d = d |
| compose | (compose d e) f = compose d (compose e f) |
| compose | s c' = compose c s' where (c', s') = transform(s, c) |

Transform/Compose Commutation

In order to provide for more efficient collaborative editing, the inventor has recognised that it is advantageous to design/provide compose and transform functions that satisfy what will be referred to as the transform/compose commutation property.

The transform/compose commutation property establishes an equivalence between performing a sequence of transform operations followed by a compose operation with performing a sequence of composition operations followed by a single transform operation. In other words, transforming then composing is equivalent to composing then transforming (i.e., composition and transformation are commutative).

When a domain satisfies the transform/compose commutation property the property can be leveraged by a protocol to efficiently synchronise data between a client and server. One example of such a protocol is described above however alternative protocols are possible.

Synchronisation Example: Single Server Delta, Sequential Client Deltas

Figure 9:
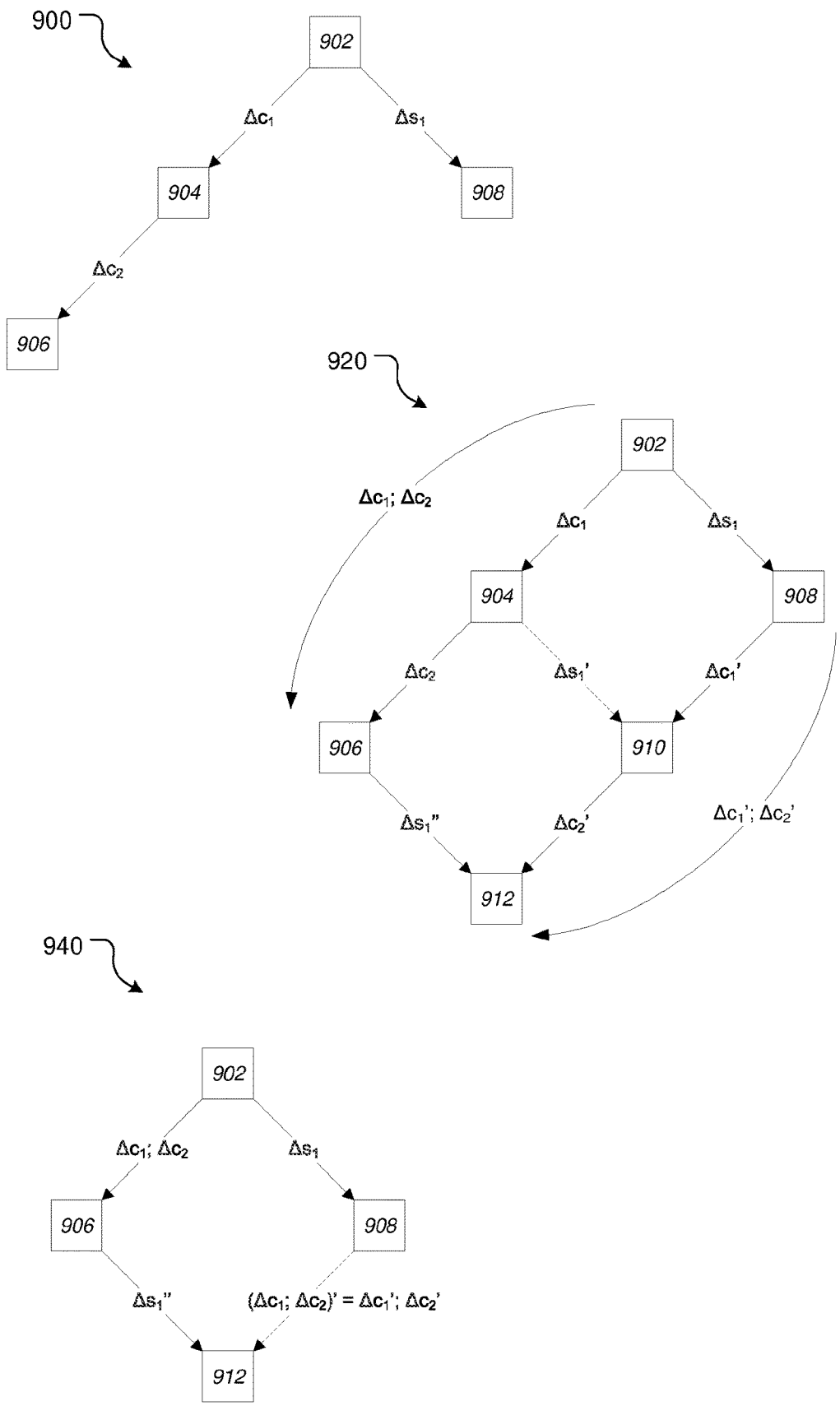
FIG. 9 provides example state space diagrams.

An example will be provided with reference to state space diagrams 900, 920, and 940 of FIG. 9.

The present example commences with a client application (e.g. CA 120A) and SA 110 synchronised at a particular object state 902. From the synchronised state 902, the CA 120A applies a sequence of deltas: $\Delta c_1$ then $\Delta c_2$, which transition the client's local version of the object to states 904 and 906 respectively (presuming they $\Delta c_1$ and $\Delta c_2$ are sequentially applied and not composed into a single delta which is then applied). Concurrently, the server 110 receives a delta from another client application (e.g. CA 120B) ($\Delta s_1$) and applies that delta to the server version of the object, which transitions the server version of the object to state 908.

As a result: at the point the SA 110 is to process deltas $\Delta c_1$ and $\Delta c_2$ it has already processed delta $\Delta s_1$; at the point the CS 120A is to process deltas $\Delta s_1$ it has already processed deltas $\Delta c_1$ and $\Delta c_2$.

As depicted in state space diagram 920, in order process delta $\Delta s_1$, a conventional approach would be for the CA 120A and/or SA 110 to perform the following operational transformations:

Transform 1: $(\Delta c_1, \Delta s_1) \Rightarrow (\Delta c_1', \Delta s_1')$
Transform 2: $(\Delta c_2, \Delta s_1') \Rightarrow (\Delta c_2', \Delta s_1'')$ Client-side, the CA 120A could then apply delta $\Delta s_1''$ to state 906 to generate state 912. The operations performed by the CA 120A in this case are as follows:

| Function | Note |
|---|---|
| Transform $(\Delta c_1, \Delta s_1)$ | Generate $(\Delta c_1', \Delta s_1')$ |
| Transform $(\Delta c_2, \Delta s_1')$ | Generate $(\Delta c_2', \Delta s_1'')$ |
| Apply 906 $\Delta s_1''$ | Transition from state 906 to state 912 |

Server-side, the SA 110 could then apply delta $\Delta c_1'$ to state 908 to generate state 910, and apply delta $\Delta c_2'$ to state 910 to generate state 912. The operations performed by the SA 110 in this case are as follows:

| Function | Note |
|---|---|
| Transform $(\Delta c_1, \Delta s_1)$ | Generate $(\Delta c_1', \Delta s_1')$ |
| Transform $(\Delta c_2, \Delta s_1')$ | Generate $(\Delta c_2', \Delta s_1'')$ |
| Apply 908 $\Delta c_1'$ | Transition from state 908 to state 910 |
| Apply 910 $\Delta c_2'$ | Transition from state 910 to state 912 |

Alternatively, instead of sequentially applying $\Delta c_1'$ and $\Delta c_2'$, the SA 110 could perform a compose operation on $\Delta c_1'$ and $\Delta c_2'$ and apply the resulting delta to interim state 908. The operations performed by the server in this case are as follows:

| Function | Note |
|---|---|
| Transform $(\Delta c_1, \Delta s_1)$ | Generate transformed deltas $(\Delta c_1', \Delta s_1')$ |
| Transform $(\Delta c_2, \Delta s_1')$ | Generate transformed deltas $(\Delta c_2', \Delta s_1'')$ |
| Compose $\Delta c_1'$ $\Delta c_2'$ | Generate a single delta $(\Delta(c_1', \Delta c_2'))$ |
| Apply 908 $\Delta(c_1', \Delta c_2')$ | Transition from state 908 to state 912 |

Typically, the algorithms supporting transform and compose operations have a complexity that is linear in the size of its inputs. I.e. transform ($\Delta c$, $\Delta s$) is $O(c+s)$ and compose ($\Delta c_1$, $\Delta c_2$) is $O(c_1+c_2)$. For a client-delta sequence of length n, therefore, this method of synchronisation results in an overall complexity of $O(n(s+c))$.

By providing compose and transform functions that satisfy the transform/compose commutation property, however, client synchronisation in this example can be achieved with a single transformation step. This requires the transform and compose functions to be such that the update paths depicted in state space 920 and described above are equivalent to the update paths depicted in state space 940—i.e. so that the following two sequences of operations are equivalent:

| Operation sequence 1 | Operation sequence 2 |
|---|---|
| Transform $(\Delta c_1, \Delta s_1) = (\Delta c_1', \Delta s_1')$ | Compose $(\Delta c_1, \Delta c_2) = \Delta(c_1, c_2)$ |
| Transform $(\Delta c_2, \Delta s_1') = (\Delta c_2', \Delta s_1'')$ | Transform $(\Delta(c_1, c_2), \Delta s_1) = (\Delta(c_1, c_2)', \Delta s_1'')$ |
| Apply 906 $\Delta s_1'' = 912$ | Apply 906 $\Delta s_1'' = 912$ |

This allows for more computationally efficient synchronisation. Specifically, for a client-delta sequence of length n, the improved process has a complexity of O(s+nc) (compared with complexity of O(ns+nc) of the previous process).

While this example describes a sequence of two client deltas that are transformed against a single server delta, the same principles apply to a sequence of any number of client deltas that need to be transformed against a single server delta.

Synchronisation Example: Sequential Server Deltas, Single Client Delta

The examples described above with respect to FIG. 9 deal with a single server update and multiple sequential client updates. The same principles apply where there is a single client update and multiple server updates. This scenario is described with state space diagrams 1000, 1020, and 1040 of FIG. 10.

Figure 10:
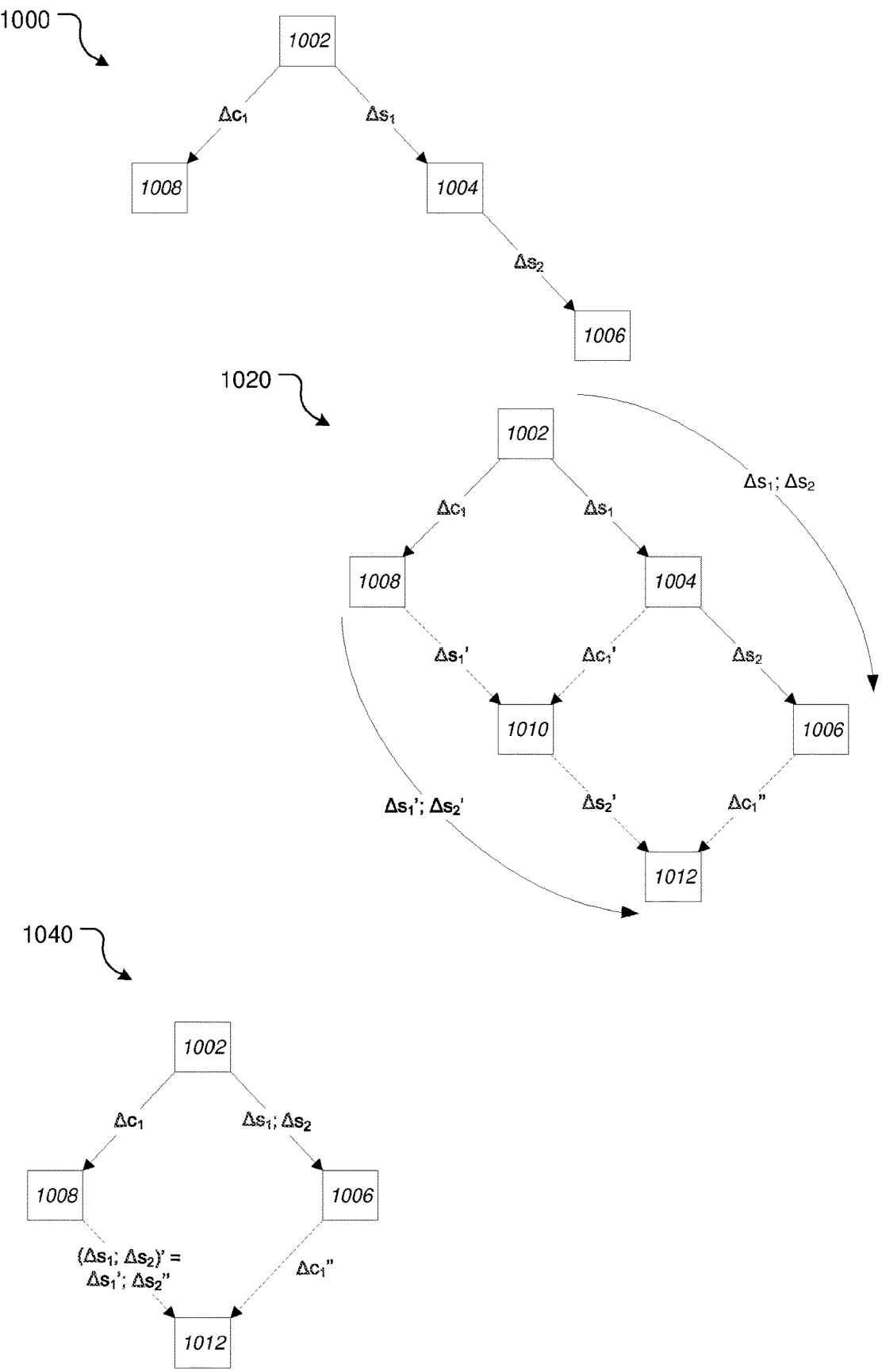
FIG. 10 provides example state space diagrams.

In the example of FIG. 10, the SA 110 applies two deltas $\Delta s_1$ and $\Delta s_2$ while a particular CA 120 (e.g. CA 120A) applies a single delta $\Delta c_1$.

In order to re-synchronise the object, a conventional approach would be for the SA 110 to perform the following operational transformations:

Transform 1: $(\Delta s_1, \Delta c_1) \Rightarrow (\Delta s_1', \Delta c_1')$

Transform 2: $(\Delta s_2, \Delta c_1') \Rightarrow (\Delta s_2', \Delta c_1'')$ The SA 110 could then apply delta $\Delta c_1''$ to state 1006 to generate state 1012 (as depicted in state space diagram 1020). The operations performed by the SA 110 in this case are as follows:

| Function | Note |
|---|---|
| Transform $(\Delta s_1, \Delta c_1)$ | Generate $(\Delta s_1', \Delta c_1')$ |
| Transform $(\Delta s_2, \Delta c_1')$ | Generate $(\Delta s_2', \Delta c_1'')$ |
| Apply 1006 $\Delta c_1''$ | Transition from state 1006 to state 1012 |

In accordance with the present disclosure, however, server synchronisation in this scenario can be achieved with a single transformation step as follows:

| Function | Note |
|---|---|
| Transform $(\Delta s_1, \Delta s_2)$ | Generate $\Delta(s_1, s_2)$ |
| Transform $(\Delta(s_1, s_2), \Delta c_1)$ | Generate $(\Delta(s_1, s_2)', \Delta c_1'')$ |
| Apply 1006 $\Delta c_1''$ | Transition from state 1006 to state 1012 |

As above, while this example describes a sequence of two server deltas that are transformed against a single client delta, the same principles apply to a sequence of any number of server deltas that need to be transformed against a single client delta.

The efficiency provided by the present disclosure is more pronounced when resolving a sequence of client deltas against a sequence of server deltas. For a client-delta sequence of length n and a server-delta sequence of length m, the conventional synchronisation method would be O(mn (s+c)). In contrast, the transform/compose commutation property described herein provides for complexity of O(ms+nc).

More specifically, leveraging the transform/compose commutation property decreases the cost of an operational transformation (OT) based synchronisation protocol by turning an operation that would, absent the transform/compose commutation property, be quadratic into an operation that is linear.

Figure 12:
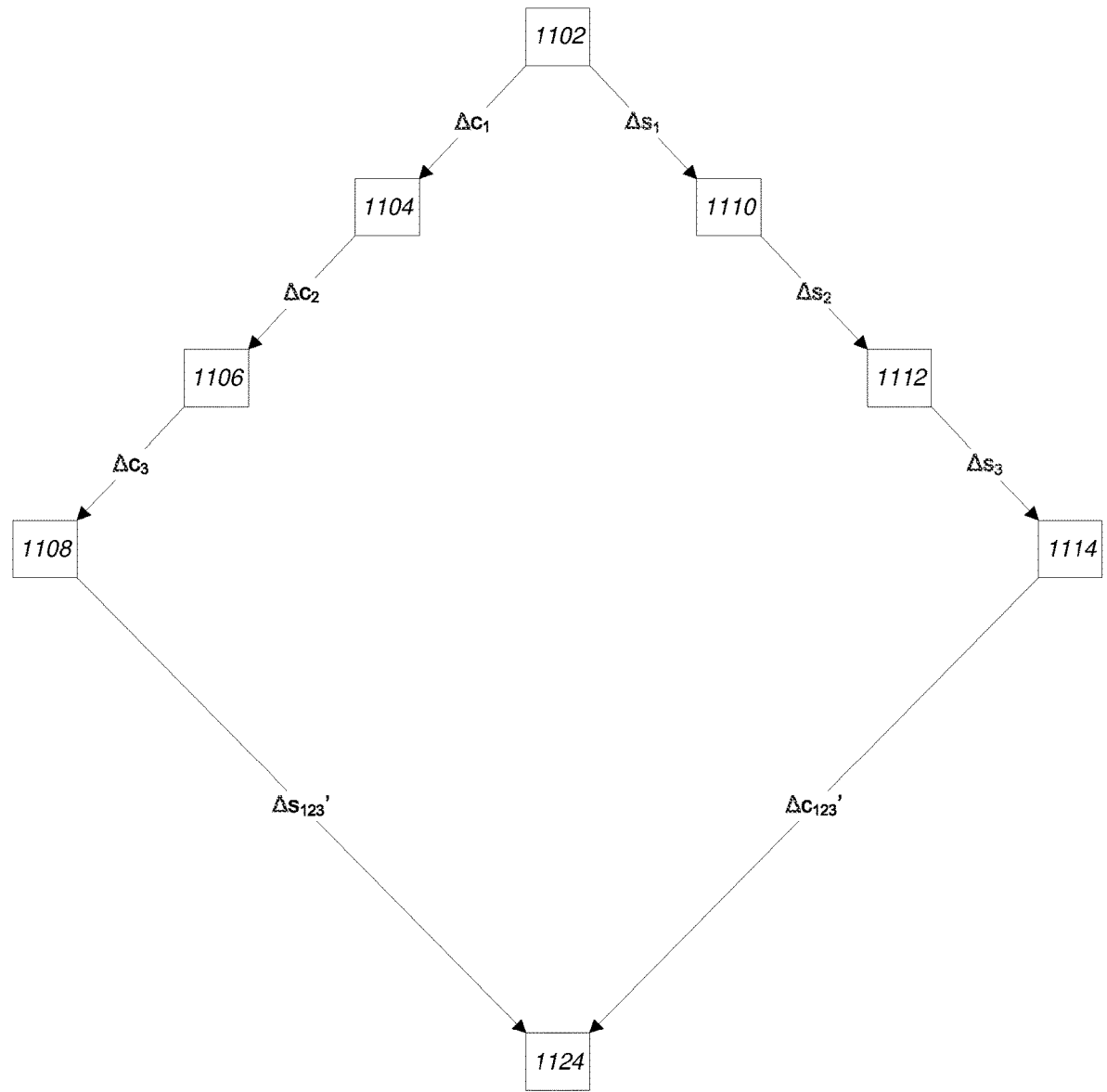
FIG. 12 is an example state space diagram.

A further illustration of the present disclosure is provided with reference to state space diagrams of FIGS. 11 and 12. FIGS. 11 and 12 show state space diagrams in which a client makes three local edits ($\Delta c_1$ to $\Delta c_3$) and at the same time the server makes 3 server edits ($\Delta s_1$ to $\Delta s_3$).

FIG. 11 depicts the transformations that would be required absent the transform/compose commutation property. In this case, in order to synchronise, the client can:

transform $(\Delta c_1, \Delta s_1) = (\Delta c_1', \Delta s_1')$
transform $(\Delta c_2, \Delta s_1') = (\Delta c_2', \Delta s_1'')$
transform $(\Delta c_3, \Delta s_1'') = (\Delta c_3', \Delta s_1''')$
apply (state 1108, $\Delta s_1''')$=state 1120
transform $(\Delta c_1', \Delta s_2) = (\Delta c_1'', \Delta s_2')$
transform $(\Delta c_2', \Delta s_2') = (\Delta c_2'', \Delta s_2'')$
transform $(\Delta c3', \Delta s_2'') = (\Delta c_3'', \Delta s_2''')$
apply (state 1120, $\Delta s_2''')$=state 1122
transform $(\Delta c_1'', \Delta s_3) = (\Delta c_1''', \Delta s_3')$
transform $(\Delta c_2'', \Delta s_3') = (\Delta c_2''', \Delta s_3'')$
transform $(\Delta c_3'', \Delta s_3'') = (\Delta c_3''', \Delta s_3''')$
apply (state 1122, $\Delta s_3''')$=state 1124

The server would need to undertake a similar set of operations.

In contrast, FIG. 12 depicts the transformations that can be used where the transform/compose commutation property is present. In this case, the client can:

compose $(\Delta c_1, (\text{compose}(\Delta c_2, \Delta c_3)) = \Delta c_{123}$
compose $(\Delta s_1, (\text{compose}(\Delta s_2, \Delta s_3)) = \Delta s_{123}$
transform $(\Delta c_{123}, \Delta s_{123}) = (\Delta c_{123}', \Delta s_{123}')$
apply (state 1108, $\Delta s_{123}')$=state 1124

The server perform similar operations, then:

apply (state 1114, $\Delta c_{123}')$=state 1124

Example Domains

This section provides example domains designed to satisfy the transform/compose commutation property described above.

The domains described can be used as building block domains; that is, they can be combined in various ways to express a wide range of application-specific data schemas. Any schema expressed using these domains inherits the synchronisation efficiencies described above.

For each domain, example algorithm implementations are presented in Haskell syntax, for clarity and brevity.

Primitive Domains

Unit Domain

The Unit domain is a degenerate domain. It has a single state, and a single way of evolving that state: doing nothing. In Haskell, the Unit domain can be expressed as follows:

```
data Unit = Unit
instance Domain Unit Unit where
    identity    _         = Unit
    apply       _ _       = Unit
    unapply     _ _       = Unit
    compose     _ _       = Unit
    transform   (_, _)    = (Unit, Unit)
```

A unit domain such as this may be useful in test objects.

Const Domain

The Const domain is a domain in which states are arbitrary, but only identity deltas are permitted. I.e., there is no way for a value to evolve from one state to another state.

In Haskell, the Const domain can be expressed as follows:

```
data ConstState s = Const s
data ConstDelta s = Id
instance Domain (Conststate s) (ConstDelta s) where
    identity    _         = Id
    apply       s _       = s
    unapply     s _       = s
    compose     _ _       = Id
    transform   (s, c)    = (c, s)
```

The Const domain is used to describe a value that cannot change. In a collaborative data model, some elements can be given immutable identifiers. For example, in a document editor, each page might be given a UUID. It should not be possible for a page's UUID to change. Representing a page's identifier as a Const domain allows both its value (the UUID) and its immutability (there is no delta to change it) to be represented in this domain style.

Counter Domain

The Counter domain represents a number that evolves only by increments. The state of a counter can be represented as an Int. A delta to a counter (i.e. an increment) can also represented as an Int.

In Haskell, the Counter domain can be expressed as follows:

```
instance Domain Int Int where
    identity    _         = 0
    apply       s d       = s + d
    unapply     s d       = s - d
    compose     d e       = d + e
    transform   (s, c)    = (c, s)
```

As with the Unit domain, the Counter domain may be useful in test objects.

Higher-Order Domains

Higher-order domains are generated from other domains, e.g. as higher-order datatypes produce new data-types from existing data-types.

Pair and Product Domains

The Pair and Product domains are higher order domains (in the sense they are new domains produced from existing domains, in the same way that higher-order datatypes produce new datatypes from existing datatypes).

The Pair domain takes two domains, A and B, and produces a domain that represents a pair of entities: one from domain A and one from domain B. A pair evolves by deltas that are pairs of deltas from the original domains: one delta from domain A and one delta from domain B. The states and deltas of a Pair entity are both represented using the pair type (_, _).

In Haskell, the Pair domain can be expressed as follows:

```
instance (Domain s d, Domain t e) => Domain (s, t) (d, e) where
    identity (s, t)              = (identity s , identity t )
    apply (s, t) (d, e)          = (apply s d , apply t e )
    unapply (s, t) (d, e)        = (unapply s d , unapply t e )
    compose (d, e) (d', e')      = (compose d d', compose e e')
    transform ((s1, s2),(c1, c2)) = ((c1', c2'), (s1', s2'))
                                 where (c1', s1') = transform (s1, c1)
                                       (c2', s2') = transform (s2, c2)
```

The Product domain is the generalization of the Pair domain to an arbitrary collection of component domains.

For example, the product of domains A, B, C, and D represents a tuple of entities: one from domain A, one from domain B, one from domain C, and one from domain D. The Product domain can be generalized from the Pair domain by distributing the domain functions (identity, apply, unapply, . . . ) over all components in the same way as a pair.

By way of example, when expressed in languages like Java or JavaScript, the "tuples" of a Product domain may be expressed as Map objects (dictionaries).

For example, in the context of a collaborative presentation application, a Content domain might be defined as the Product of: a Box<String> domain keyed as "title"; and a List<Page> domain keyed as "pages" (Box and List domains described below).

Either and Sum Domains

The Either domain takes two domains, A and B, and produces a domain that represents a disjoint "either" of entities: one from domain A or one from domain B. An "either" evolves by deltas that are either deltas from the original domain A or deltas from the original domain B. The states and deltas of an Either entity are represented using the Either type.

In Haskell, the either domains can be expressed as follows:

```
instance (Domain s d, Domain t e) => Domain (Either s t) (Either d e)
where
    identity (Left s)            = Left (identity s)
    identity (Right t)           = Right (identity t)
    apply (Left s) (Left d)      = Left (apply s d)
    apply (Right t) (Right e)    = Right (apply t e)
    unapply (Left s) (Left d)    = Left (unapply s d)
    unapply (Right t) (Right e)  = Right (unapply t e)
    compose (Left s) (Left d)    = Left (compose s d)
    compose (Right t) (Right e)  = Right (compose t e)
    transform (Left s, Left c)   = (Left c', Left s')
                                 where (c', s') = transform (s, c)
    transform (Right s, Right c) = (Right c', Right s')
                                 where (c', s') = transform (s, c)
```

The Sum domain is the generalization of the Either domain to an arbitrary number of domains. For example, the sum of domains A, B, C, and D represents a union of entities: one from domain A, one from domain B, one from domain C, or one from domain D. The Sum domain can be generalized from the Either domain.

By way of example, in the context of a collaborative design application, a design element might be one of a handful of element "types", such as an "image" element, a "shape" element, or a "text" element. For given ImageElement, ShapeElement, and TextElement domains, this can be expressed as an Element domain defined as a Sum domain over: an ImageElement domain tagged as "image"; and a ShapeElement domain tagged as "shape"; and a TextElement domain tagged as "text".

When modelled this way, an object in the Element domain can be one of those particular element types, but cannot evolve from one type to another: it retains its type for its lifetime.

Box Domain

The Box domain turns any existing domain into another domain by adding lifecycle semantics over its states. A boxed entity can evolve by either: an update from within its original domain; or being replaced (re-instantiated) with any state from the original domain.

In Haskell, the Box domain can be expressed as follows:

```
data BoxState s   = Box s
data BoxDelta s d = Update d | Replace s s
instance (Domain s d, Eq s) => Domain (BoxState s) (BoxDelta s d)
where
   identity (Box s) = Update (identity s)
   apply      (Box s) (Update d)                      = Box (apply s d)
   apply      (Box s) (Replace s_ s') | s == s_       = Box s'
   unapply    (Box s) (Update d)                      = Box (unapply s d)
   unapply    (Box s) (Replace s_ s') | s == s'       = Box s_
   compose    (Update d)      (Update e)     = Update (compose d e)
   compose    (Update d)      (Replace t t') = Replace (unapply t d) t'
   compose    (Replace s s')  (Update e)     = Replace s (apply s' e)
   compose    (Replace s s')  (Replace t t')
                              | s' == t      = Replace s t'
   transform (Update d       , Update e    ) = (Update e', Update d')
                                               where (e', d') = transform (d, e)
   transform (Update d       , Replace t t') = (Replace (apply t d) t', Update
                                                  (identity t))
   transform (Replace s s'   , Update e    ) = (Update (identity s),
                                                  Replace (apply s e) s')
   transform (Replace s s'   , Replace t t')
                              | s' == t'     = (Update (identity s), Replace t' s')
```

For example, in the context of a collaborative design application, a page might have a "background" property, whose schema is described by a Product domain of an image, a crop box, and a transparency value. That representation would allow those different aspects of that page background, such as the crop-box and the transparency, to be edited concurrently and independently. Representing that schema as a Box of that Product domain (instead of the Product domain directly) extends the set of possible edits to include not just individual edits (as Updates) to particular aspects of that background (such as a change in transparency), but also edits (as Replaces) that atomically replace the entire background with a concretely specified one. This embodies the distinction between the user actions of modifying an existing page background vs replacing a page background with a fresh new one.

MList Domain

The MList domain is another higher-order domain. It takes an existing domain and produces a monotonically-growing list of entities from the original domain. A list entity can evolve by having new entities from the original domain inserted at any position, and by having any of its existing entities updated by a delta from the original domain.

In Haskell, the MList domain can be expressed as follows:

```
data MListOp s d    = Insert s | Update d
type MListState s   = [s]
type MListDelta s d = [MListOp s d]
instance (Domain s d, Eq s) => Domain (MListState s) (MListDelta s d) where
    identity _                                     = [ ]
    apply      ss       [ ]                        = ss
    apply      ss       ((Insert s):ds)            = s:(apply ss ds)
    apply      (s:ss)   ((Update d):ds)            = (apply s d):(apply ss ds)
    unapply    ss       [ ]                        = ss
    unapply    (s:ss)   ((Insert s'):ds) | s == s' = unapply ss ds
    unapply    (s:ss)   ((Update d):ds)            = (unapply s d):(unapply ss ds)
    compose    [ ]      es                         = es
    compose    ds       [ ]                        = ds
    compose    ds       ((Insert t):es)            = (Insert t):(compose ds es)
    compose    ((Insert s):ds)   ((Update e):es)   = (Insert (apply s e)):(compose ds es)
    compose    ((Update d):ds)   ((Update e):es)   = (Update (compose d e)):(compose ds es)
    transform ([ ]              , cs           )   = (cs, [ ])
    transform (ss               , [ ]          )   = ([ ], ss)
    transform ((Insert s):ss    , cs           )   = ((Update (identity s)):cs',
                                                       (Insert s):ss')
                                                     where (cs', ss') = transform (ss, cs)
```

| | | |
|---|---|---|
| transform (ss | , (Insert c):cs) | = ((Insert c):cs', (Update (identity c)):ss') where (cs', ss') = transform (ss, cs) |
| transform ((Update s):ss | , (Update c):cs) | = ((Update c'):cs', (Update s'):ss') where (cs', ss') = transform (ss, cs) (c', s') = transform (s, c) |

For example, in the context of a collaborative design application, a page might have a list of design elements. That collection of design elements could be described by an MList<Element>, for some Element domain that describes the schema of an individual element.

However, in practice, the MList domain is not used directly. Instead, it is used in the context of the List domain (as described below).

IDict Domain

The IDict domain takes a domain A and a state s of A and produces a new domain, (IDict A s). The states of the domain are each a string-keyed dictionary of A states, with all other keys mapping to s.

For example, given the Counter domain, the (IDict Counter 0) domain:
- has a state {"foo": 1, "bar": 2} that represents a dictionary where:
  + the key "foo" maps to the counter state 1;
  + the key "bar" maps to the counter state 2; and
  + all other possible keys, such as "baz", "quux", etc., map to the counter state 0.
- has a delta {"foo": +1, "bar": 2} that represents a dictionary-delta where:
  + the state for key "foo" is to be incremented by +1 (as per the Counter delta +1)
  + the state for key "bar" is to be incremented by +2 (as per the Counter delta +2)
  + the states for all other keys, such as "baz", "quux", etc., are to be incremented by +0 (as per the Counter identity delta +0)

The IDict identity function (identity s) generates the empty dictionary.

The IDict apply function (apply s d) produces a new dictionary with keys from both s and d. Each new key k is mapped to the state produced by (apply s[k] d[k]) from the component domain, filtered to elide entries whose value equals the dictionary-default state.

The IDict unapply function (unapply s d) produces a new dictionary with keys from both s and d. Each new key k is mapped to the state produced by (unapply s[k] d[k]) from the component domain, filtered to elide entries whose value equals the dictionary-default state.

The IDict compose function (compose d e) produces a new dictionary with keys from both d and e. Each new key k is mapped to the delta produced by (compose d[k] e[k]) from the component domain, filtered to elide entries whose value equals the identity delta from the component domain.

The IDict transform function (transform s c) produces new dictionaries (c' and s') with keys from both s and c. (c'[k], s'[k]) are set to the deltas produced by (transform s[k] c[k]) from the component domain, filtered to elide entries whose value equals the identity delta from the component domain.

To further illustrate the IDict domain, the following are examples in the (IDict Counter 0) domain:
identity { }=true
apply {"foo": 1, "bar": 2} {"foo": +1, "bar": −2, "baz": +1}={"foo": 2, "baz": 1}
unapply {"foo": 2, "baz": 1} {"foo": +1, "bar": −2, "baz": +1}={"foo": 1, "bar": 2}
compose {"foo": +1, "bar": +2} {"foo": +1, "bar": −2, "baz": +1}={"foo": +2, "baz": +1}
transform ({"foo": +1, "bar": +2}, {"foo": +1, "baz": +3})=({"foo": +1, "baz": +3}, {"foo": +1, "bar": +2})

Additional Domains

The domains defined above are sufficient to contain a working set of operational transformation algorithms.

Additional domains can, however, be provided.

By way of example, the following additional domains are functionally equivalent to combinations of the domains above, but have direct implementations that provide for operational simplicity and efficiency.

Option Domain

The Option domain takes a domain and embellishes it with optionality. Functionally, the Option domain can be expressed using the Either and Unit domains described above. Specifically, given a domain A, the Option domain of A is equivalent to either nothing (unit) or an A:
Option a=Either Unit a List Domain The monotonic aspect of the MList domain described above (where it only ever grows) can make it an inconvenient data model in certain applications. The List domain provides a list from which items can also be deleted.

Given a domain A, a general list of A entities is defined as a monotonically-growing list of optionally-empty boxes of A entities:
List a=MList (Box (Option a))

As will be appreciated, the underlying list state is still monotonic, but can be viewed as a regular list by filtering out its empty items:

| | |
|---|---|
| asList :: MListState (BoxState (Option s))] -> [s] | |
| asList [ ] | = [ ] |
| asList ((Box (Left _)):ss) | = asList ss |
| asList ((Box (Right s)):ss) | = s:(asList ss) |

An element with state s is "deleted" from the list with a delta that contains the update:
Update (Box.Replace (Just s) Nothing)
This update evolves the list to one that has Unit/Nothing in the place of the deleted entity.

Plaintext Domain

The Plaintext domain defines a string of editable text, where characters can be inserted or deleted anywhere in the string. Functionally, this is equivalent to a List (as defined above) of constant characters:
Plaintext=List (Const Char)

Dict Domain

In a similar manner to how the List domain is an alternative version of an MList domain, the Dict domain is an alternative version of the IDict domain in which entries are made optional by wrapping them in boxes:

Dict a=IDict (Box (Option a))

"Inserting" an entry with key k and value s is then understood to mean applying an op:

Update k (Box.Replace Nothing (Just s))

Similarly, "deleting" an entry with key k and value s is understood to mean applying an op:

Update k (Box.Replace (Just s) Nothing)

MStream Domain

The MStream domain is similar to the MList domain, however it has different deltas that describe growth by cloning (and modifying) list entries, rather than inserting new list entries with a particular state.

The MStream domain takes a domain A and produces a domain of monotonically-growing stream of entities from A, paired with a state from A that represents an infinite prefix and infinite suffix, called the "background state". For example, the (MStream Counter 0) domain is a stream of counters with a background state of 0. In that domain, the state:

[4,2,8]

corresponds to the finite list [4, 2, 8] embedded within a background of 0s:

| Position | ... | −3 | −2 | −1 | 0 | 1 | 2 | 3 | 4 | ... |
|---|---|---|---|---|---|---|---|---|---|---|
| Value | ... | 0 | 0 | 0 | 4 | 2 | 8 | 0 | 0 | ... |

The deltas of the MStream domain are the same as the deltas of the MList domain, except that the (Insert s) op is replaced by a (Copy d) op.

data MStreamOp s d=Copy d|Update d
type MStreamState s=[s]
type MStreamDelta s d=[MStreamOp s d]

As with MList, the meaning of the (Update d) op is to update a list cell with delta d. The meaning of the (Copy d) op is to insert a new cell as a copy of the previous cell, modified by delta d.

AttributeStream Domain

Like the List and Dict domains, the AttributeStream domain is a combination of other domains.

In particular, the AttributeStream domain represents a specific instantiation of the MStream domain, as a stream of "attribute dictionaries":

AttributeStream=Stream (IDict (Box (Optional (Const String))) Unit)

In other words, a state in the AttributeStream domain is a stream (i.e., a list) of dictionaries, with each dictionary being a map of string keys to string values. For example:

[{"font-size": "10", "font-weight": "bold"},
{"font-size": "10", "colour": "red"},
{"colour": "red"}]

For ease of description, the disclosure above has assumed that any user in a collaboration session can perform any available action with respect to a given object (i.e. read/view, write/edit, create, delete). The actions available for a given user and/or given entity may, however, be modified by permissions. For example, permissions may be created that allow a given user to view but not edit a given object.

The processing illustrated in the figures and described above define operations in particular orders to explain various features. In some cases the operations described and/or illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. . Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

Unless required by context, the terms "first", "second", etc. are used to differentiate between various elements and features and not in an ordinal sense. For example, a first message could be termed a second message, and, similarly, a second message could be termed a first message, without departing from the scope of the various described examples.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method for editing an electronic object, the electronic object being edited in real time by multiple client applications, wherein the method is performed by a first client application operating on a first client system and includes:
    maintaining, at the first client system, a local version of the electronic object;
    maintaining, at the first client system, a local buffer, the local buffer including one or more local deltas, each local delta describing one or more edits made to the local version of the electronic object by a user of the first client application;
    receiving, at the first client system, a first local edit made to the local version of the electronic object by the user of the first client application;
    in response to receiving the first local edit:
        generating a first local delta describing the first local edit;
        generating a first client submit message that includes the first local delta and communicating the first client submit message to a server system; and
        adding the first local delta to the local buffer;
    receiving, from the server system, a plurality of server deltas, each server delta being in respect of a remote edit made to the electronic object;
    composing the plurality of server deltas to generate a single composed server delta;
    transforming the single composed server delta against the one or more local deltas in the local buffer to generate a transformed server delta; and
    editing the local version of the electronic object by applying the transformed server delta to the local version of the electronic object.

2. The computer implemented method of claim 1, wherein adding the first local delta to the local buffer includes flagging the first local delta as unacknowledged.

3. The computer implemented method of claim 2, further including:
receiving a first server acknowledgement message from the server system, the first server acknowledgement message acknowledging the first local delta; and
in response to receiving the first server acknowledgement message, clearing the first local delta from the local buffer.

4. The computer implemented method of claim 3, wherein:
the first client submit message further includes a first client version identifier;
the first server acknowledgement message includes the first client version identifier;
the local buffer includes one or more additional local deltas, each of the one or more additional local deltas being flagged as unacknowledged at the time the first server acknowledgement message is received, each of the one or more additional local deltas being associated with a client version identifier that indicates an earlier version than the first client version identifier; and
in response to receiving the first server acknowledgement message the method further includes clearing the one or more additional local deltas from the client buffer.

5. The computer implemented method of claim 1, further comprising:
receiving a second local edit made to the local version of the electronic object by the user of the first client application;
generating a second local delta corresponding to the second local edit;
receiving a third local edit made to the local version of the electronic object by the user of the first client application;
generating a third local delta corresponding to the second local edit;
composing the second local delta and the third local delta to generate a fourth local delta; and
adding the fourth local delta to the local buffer.

6. A computer processing system comprising:
a processing unit;
a communications interface; and
a non-transitory computer-readable storage medium storing instructions, which when executed by the processing unit, cause the processing unit to:
maintain, at the computer processing system, a local version of an electronic object being edited in real time by multiple client applications;
maintain, at the computer processing system, a local buffer, the local buffer including one or more local deltas, each local delta describing one or more edits made to the local version of the electronic object by a user of the computer processing system;
receive, at the computer processing system, a first local edit made to the local version of the electronic object by the user of the computer processing system;
in response to receiving the first local edit:
generate a first local delta describing the first local edit;
generate a first client submit message that includes the first local delta and communicate the first client submit message to a server system; and
add the first local delta to the local buffer;
receive, from the server system via the communications interface, a plurality of server deltas, each server delta being in respect of a remote edit made to the electronic object;
compose the plurality of server deltas to generate a single composed server delta;
transform the single composed server delta against the one or more local deltas in the local buffer to generate a transformed server delta; and
edit the local version of the electronic object by applying the transformed server delta to the local version of the electronic object.

7. The computer processing system of claim 6, wherein execution of the instructions further causes the processing unit to:
generate a fourth local delta by:
receiving a second local edit made to the local version of the electronic object by the user of the computer processing system;
generating a second local delta corresponding to the second local edit;
receiving a third local edit made to the local version of the electronic object by the user of the computer processing system;
generating a third local delta corresponding to the second local edit; and
composing the second local delta and the third local delta to generate the fourth local delta; and
add the fourth local delta to the local buffer;
generate a second client submit message, the second client submit message including the fourth local delta; and
communicate second client submit message to the server system.

8. The computer processing system of claim 6, wherein adding the first local delta to the local buffer includes flagging the first local delta as unacknowledged.

9. The computer processing system of claim 6, wherein execution of the instructions further causes the processing unit to:
receive a first server acknowledgement message from the server system, the first server acknowledgement message acknowledging the first local delta; and
in response to receiving the first server acknowledgement message, clear the first local delta from the local buffer.

10. The computer processing system of claim 9, wherein:
the first client submit message further includes a first client version identifier;
the first server acknowledgement message includes the first client version identifier;
the local buffer includes one or more additional local deltas, each of the one or more additional local deltas being flagged as unacknowledged at the time the first server acknowledgement message is received, each of the one or more additional local deltas being associated with a client version identifier that indicates an earlier version than the first client version identifier; and
execution of the instructions further causes the processing unit to, in response to receiving the first server acknowledgement message, clear the one or more additional local deltas from the client buffer.

11. A non-transitory computer-readable storage medium storing instructions, which when executed by a processing unit, cause the processing unit to:
maintain, at a computer processing system, a local version of an electronic object being edited in real time by multiple client applications;

maintain, at the computer processing system, a local buffer, the local buffer including one or more local deltas, each local delta describing one or more edits made to the local version of the electronic object by a user of the computer processing system;

receive, at the computer processing system, a first local edit made to the local version of the electronic object by the user of the computer processing system;

in response to receiving the first local edit:
generate a first local delta describing the first local edit;
generate a first client submit message that includes the first local delta and communicate the first client submit message to a server system; and
add the first local delta to the local buffer;

receive, from the server system via a communications interface, a plurality of server deltas, each server delta being in respect of a remote edit made to the electronic object;

compose the plurality of server deltas to generate a single composed server delta;

transform the single composed server delta against the one or more local deltas in the local buffer to generate a transformed server delta; and edit the local version of the electronic object by applying the transformed server delta to the local version of the electronic object.

12. The non-transitory computer-readable storage medium of claim 11, wherein execution of the instructions further causes the processing unit to:
generate a fourth local delta by:
receiving a second local edit made to the local version of the electronic object by the user of the computer processing system;
generating a second local delta corresponding to the second local edit;
receiving a third local edit made to the local version of the electronic object by the user of the computer processing system;
generating a third local delta corresponding to the second local edit; and
composing the second local delta and the third local delta to generate the fourth local delta; and
add the fourth local delta to the local buffer;
generate a second client submit message, the second client submit message including the fourth local delta; and
communicate second client submit message to the server system.

13. The non-transitory computer-readable storage medium of claim 11, wherein adding the first local delta to the local buffer includes flagging the first local delta as unacknowledged.

14. The non-transitory computer-readable storage medium claim 11, wherein execution of the instructions further causes the processing unit to:
receive a first server acknowledgement message from the server system, the first server acknowledgement message acknowledging the first local delta; and
in response to receiving the first server acknowledgement message, clearing the first local delta from the local buffer.

15. The non-transitory computer-readable storage medium of claim 14, wherein:
the first client submit message further includes a first client version identifier;
the first server acknowledgement message includes the first client version identifier;
the local buffer includes one or more additional local deltas, each of the one or more additional local deltas being flagged as unacknowledged at the time the first server acknowledgement message is received, each of the one or more additional local deltas being associated with a client version identifier that indicates an earlier version than the first client version identifier; and
execution of the instructions further causes the processing unit to, in response to receiving the first server acknowledgement message, clear the one or more additional local deltas from the client buffer.

* * * * *